US006826452B1

(12) United States Patent
Holland et al.

(10) Patent No.: US 6,826,452 B1
(45) Date of Patent: Nov. 30, 2004

(54) CABLE ARRAY ROBOT FOR MATERIAL HANDLING

(75) Inventors: Carl S. Holland, Charleston, SC (US); David J. Cannon, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/388,972

(22) Filed: Mar. 14, 2003

Related U.S. Application Data

(60) Provisional application No. 60/369,096, filed on Mar. 29, 2002.

(51) Int. Cl.[7] .......... G06F 19/00

(52) U.S. Cl. .......... 700/245; 700/246; 700/254; 700/258; 700/260; 700/261; 700/264; 318/566; 318/568.22; 405/191; 901/22; 901/23

(58) Field of Search .......... 700/245, 246, 700/254, 258, 260, 261, 264; 318/566, 568.22; 405/191; 901/22, 23; 91/418; 74/490.03

(56) References Cited

U.S. PATENT DOCUMENTS

| | | | | | |
|---|---|---|---|---|---|
| 4,883,184 | A | * | 11/1989 | Albus | 212/274 |
| 5,253,771 | A | * | 10/1993 | Mikulas et al. | 212/274 |
| 5,408,407 | A | * | 4/1995 | Lefkowitz et al. | 700/56 |
| 5,440,476 | A | * | 8/1995 | Lefkowitz et al. | 700/56 |
| 5,507,596 | A | * | 4/1996 | Bostelman et al. | 405/191 |
| 5,916,328 | A | * | 6/1999 | Pritschow et al. | 74/490.03 |
| 6,126,023 | A | * | 10/2000 | Durrant-Whyte et al. | 212/274 |
| 6,566,834 | B1 | * | 5/2003 | Albus et al. | 318/568.2 |

OTHER PUBLICATIONS

Bosscher et al., A stability measure for underconstrained cable–drivetn robots, 2004, Internet/IEEE, pp. 1–18.*

Momma et al., Development of gimbal type sheave for deep towing, 1983, IEEE, pp. 270–273.*

Shiang et al., Optimal force distribution applied to a robotic crane with flexible cables, 2000, IEEE, pp. 1948–1954.*

Gorman et al., The cable array robot: Theory and experiment, 2001, IEEE, pp. 2804–2810.*

Shiang et al., Dynamic analysis of th ecable array robotic crane, 1999, IEEE, pp. 2495–2500.*

Cannon et al., Operation enduring crate, Spring 2002, Internet, pp. 1–5.*

Yumori, Ocean testing of motion compensation crane and kevlar tether cable dynamics for an unmanned deep submersible using real time spectral analysis, 1979, Internet, pp. 764–771.*

* cited by examiner

*Primary Examiner*—Thomas G. Black
*Assistant Examiner*—McDieunel Marc
(74) *Attorney, Agent, or Firm*—Michael A. Mann; Nexsen Pruet Adams Kleemeier, LLC

(57) ABSTRACT

A cable array robotic system and apparatus for applications such as cargo handling at sea and pallet handling in manufacturing, based on a multi-cable robotic control system is disclosed. The cables are deployed from three or more folding, telescoping masts at the corners of a work area. The cables attach to an end-effector (e.g. a spreader mechanism) that grips an object (e.g. a container) and affects desired movements as directed by an operator through a computer controlled graphical user interface using pointing directives such as “put that there”. Various sensors and cameras enable a high degree of control over the end-effector (e.g. spreader or pallet) as it is moved from place to place. Sufficient control is possible so that the present cargo handling system may unload, without pendulation, the deck and hold of a ship onto a sea-going lighter during sea state three conditions in a container handling application at sea.

34 Claims, 17 Drawing Sheets

CABLE ARRAY ROBOT FOR MATERIAL HANDLING

CROSS-REFERENCE TO RELATED APPLICATIONS

The benefit of the filing of U.S. provisional patent application Ser. No. 60/369,096, filed Mar. 29, 2002, which is incorporated herein by reference, is claimed.

STATEMENT REGARDING FEDERALLY SPONSORED RESEARCH OR DEVELOPMENT

The U.S. government may have rights under this invention pursuant to a grant from the U.S. Navy, Grant No. N0014-98-C-0191.

REFERENCE TO A MICROFICHE APPENDIX

Not applicable

BACKGROUND OF THE INVENTION

One of the least expensive ways to move freight is by ship, and, indeed, cargo ships cross the oceans of the world hauling products from port to port, country to country. There are in particular container ships that carry cargo in large, uniform containers, such as standard, ISO 20-foot containers that meet the requirements of an international standards organization for size and configuration. The cargo containers are stacked on the large flat deck of a container ship and in its hold. Once in port, the containers are offloaded typically with an assortment of cargo handling cranes. Unloading these ships is, of course, a time-consuming task and requires a crew to assure that the right containers are removed safely and efficiently. Efficient loading and unloading are important in getting good utilization from a container ship and in meeting delivery schedules.

Once off-loaded from the ship, these containers may be loaded directly onto a truck frame with a set of wheels for hauling by tractor truck overland to a next destination. Alternatively, the cargo containers may be placed onto a smaller ship, called a lighter, for transport to a dock, a shallow water port or onto the beach in logistics-over-the-shore military operations.

Not every port or other commercial location has the large assortment of cargo handling cranes needed for off-loading large sea-going container ships. Present day fixed and mobile cranes or bridge cranes are often not practical because of cost, operating and maintenance constraints, and the time required to erect and deploy them. Furthermore, gantry cranes have relatively small workspaces within which they operate before the entire massive crane has to be moved down a permanent track on which vehicles and other objects may have inadvertently become obstacles. Even when the path is clear, the mobility limitation requires stopping the crane's operation, stowing the boom and outriggers, moving, and redeploying the boom and outriggers before operations can resume. Large rail cranes are also physically limited. Current ship-carried systems can sometimes compensate for limited port facilities, but because of the large pedestal size needed to support a rotating crane that can cover the ship deck, this is generally achieved at the expense of considerable cargo space or by requiring a separate crane ship to load and unload a cargo ship. In no case can they operate outside of well-protected port facilities where sea state three or higher conditions occur most of the time.

Loading and unloading containers using overhead or gantry cranes, in addition to their limited range of motion, have another problem. These types of cranes have X-Y actuation mechanisms from which a cable hangs like a pendulum. The pendulous nature of the gantry crane makes it less suitable for certain purposes, namely unloading ships, because it is so difficult to have the carried payload follow a trajectory without swinging. The motion of the sea results in an additional instability that translates into large swings in the payload. High wind and foul weather even further impede—or stall altogether—the process of loading and unloading these ships. When wind is blowing, the containers have to be restrained by crewmembers using ropes. This is a dangerous task. When the crane is on a ship and the sea is rough, the ship will roll and pitch, creating the same effect as high wind, namely, increased oscillation of the cargo container. Likewise, if the lifting mechanism is on a dock and the container is on the pitching, rolling deck of a ship, moving the container that is on the ship using the crane is a slow and difficult process. If the sea is too rough, such as sea state three or higher, unloading must be halted. Unfortunately, around the world, sea state three is common. There is a seventy percent chance that a ship will encounter sea state three or higher at any moment anywhere in the world.

In addition to their physical problems, traditional single boom shipboard crane systems are expensive, involve considerable maintenance, and require highly skilled operators. Dockside gantry cranes are also quite expensive to acquire, operate and maintain.

The field of robotics has developed rapidly over the past twenty years as electronic components that control robotic movements have gotten smaller and more robust. Robotic welding machines play a substantial role in manufacturing automobiles, for example. The concept of a robotic device is easy to grasp in general but hard to define with any specificity because of the large number of forms robotics devices may take. For example, robotic devices may be electrical, mechanical or electromechanical and may range from simple manipulators to vehicles for exploration of the surface of the moon, the planets or the ocean floor. Generally, however, the robotic device may be defined as a device that is capable of manipulating an object in a work place.

There is a particular type of robotic device, to which this patent lays claim, based on use of an array of cables attached to a lifting device. This "cable array robot" is defined as a robot that uses multiple cables connected together either directly or through an end-effector to manipulate an object in a workspace. A description of cable array robots is set forth by the inventor's team in *The Cable Array Robot: Theory and Experiment*, by Gorman, Jablakow and Cannon, 2001, Proceedings of the IEEE International Conference on Robotics and Automation, incorporated herein in its entirety by reference.

Three-cable and four cable systems can be used to move loads within a workspace, and computers can be programmed to control this movement. Equations of motion for a multi-cable crane system, for example, are developed using Lagrange's equations and certain assumed modes of operation. Then the resulting equations for four-cable arrays, which are kinematically redundant due to fewer degrees of freedom than the number of cables, are solved by first using a non-linear transformation to reduce the number of variables. An optimal-force distribution method can be applied to solve the transformed equations to yield a set of cable tensions needed to track a desired trajectory. The mathematical treatment of this subject is found in *Optimal Force Distribution Applied to a Robotic Crane with Flexible Cables*, by Shiang, Cannon, and Gorman, 2000, Proceedings of the IEEE Conference on Robotics and Automation, and *Dynamic Analysis of the Cable Array Robotic Crane*, by Shiang, Cannon and Gorman, 1999, Proceedings of the IEEE Conference on Robotics and Automation, both of which are incorporated herein in their entirety by reference.

The study of robotics may suggest the use of robots in the movement of cargo containers, but the complexities of real-world application, particularly in ship-to-ship movement of containers in sea state three conditions impose significant challenges. Nonetheless, there remains a need for a better way to move cargo containers than traditional cranes, particularly in loading and unloading ships during all weather conditions and in related tasks such as underway cargo replenishment, at-sea missile replenishment and mobile offshore basing. Other applications for the cable array robot cross a full range including hazardous waste remediation (e.g. radioactive waste drum handling in open fields), painting or de-icing vehicles (e.g. airplane servicing when they taxi into the workspace), open-pit mining (e.g. truck loading at the mine surface to avoid building and traveling miles of pit roads), and overhead pallet handling in manufacturing (e.g. to move pallets loaded with workpieces from one workcell to the next). The invention also envisions a new class of the world's largest robots including array robots with workspaces of nearly unlimited size including construction sites between tall buildings and stockyards or port areas engulfing whole valleys or fjords between nearby mountains on which the system's mast structures are mounted. Since there are many applications, for the cable array robot, the term end-effector hereinafter refers to any tool or sensor suite to which the cables of the cable array are attached, and the term container refers to any object with which such an end-effector may interact. In a navy sea basing application, for example, the end-effector may be a spreader and the container may be an ISO shipping container.

SUMMARY OF THE INVENTION

The present invention is a system and method for acting from overhead upon an environment such as when cargo is unloaded from a container ship onto a dock or other ship such as a lighter in shipping operations. The present invention has components in four basic categories: 1) the end-effectors (e.g. a spreader for gripping a standard cargo container in a shipping application, a pallet handler for gripping batches of workpieces in a manufacturing application or an excavating tool handler for using tools to expose and retrieve material in a hazardous waste remediation or open-pit mining application); 2) a multi-cable robotic array to move the end-effector throughout an extended workspace; 3) a computer controller with graphical user interface for allowing an operator to control the robotic array, and thereby the position and orientation of any objects such as a shipping container, that is attached to the end-effector; and 4) a system of cameras and sensors to provide information to the computer controller that is programmed to use the camera and sensor information as input to container movement decisions. Essentially, the operator uses this information in giving instructions (such as "put that there" directives to the programmed computer, which then controls the end-effector through supervisory control of the robotic array in moving a container. The computer interprets the operator's instructions by ultimately translating operator directives into a set of tensions on the four cables of the robotic array throughout semi-autonomous trajectories. A supplemental power source and one or more offload fairleads are optional but useful additional components. Only the cables and cargo move, during operations, so the system is fast, stable, and energy-efficient as well as capable of covering a very large area compared to boom cranes that must slew with every move and even then can merely cover a limited work area.

The entire system of subsystems described herein was built at $1/16^{th}$ scale (or ¼ scale for some components) for a container offloading application at sea. Where more than one version of software and hardware was implemented, one implementation is referred to as the preferred embodiment. A videotape was made of the model in operation.

The robotic array may include folding, telescoping masts with winches and cables that cooperate to move the end-effector for the case where retractability of the masts is desired when the system is not in use. Each mast is seated in a supporting structure built into a platform, dock or ship deck. The tips of these masts, over which the cables pass, define the corners of the workspace. Cameras, located in one or more places (e.g. carried on the bridge of a ship or by the masts near the tip) provide a wide-angle field of view of this workspace.

The end-effector for handling ISO containers includes an active spreader and may include a messenger spreader. The end-effector grips and manipulates the container within the workspace using the features of the active and messenger spreaders. The messenger spreader may be deployed from the active spreader using four small winches on the latter, or using a pulley arrangement (a "clothsline approach") that allows use of a main winch to lower the spreader, when a container must be retrieved from within the ship's hold. The end-effector is capable of controlling the container's roll and pitch attitude to compensate for the center of gravity of the container being off-center, and can rotate the container about a vertical axis. The end-effector also carries additional sensors and cameras for close-in views and control of the container and its own movements. Laser ranging is used, for example, to guide container landings and machine vision is used to guide container pick ups.

The computer controller is adapted to receive and process information and respond to directions from the operator. It is a real-time, automatic feedback computer programmed for high-level functionality so that the operator requires little computer skill and training and yet has considerable flexibility in choices of container movement. It is programmed with control algorithms and a point-and-direct graphical user interface that enables the operator to target any point in the work area. These algorithms solve, in real time, the closed-chain kinematics and dynamics equations for desired movement of the containers, and cause the computer controller to adjust the length of the cables from the mast assemblies by operating winches associated with each cable. The movement of the cables in turn moves the end-effector and its grasped container according to the solution found by the algorithms. The user interface is independent of the number of mast assemblies used as long as at least three are used.

The graphical user interface allows the operator to see an interwoven virtual/live workspace including both virtual and live objects. Virtual tools, as the team calls them, are selected from a toolbox of graphical representations of end-effectors that are available for a particular application. These virtual tools are overlaid on live images of the containers within that workspace. They are manipulated in the scene using a computer mouse or instrumented glove much like a real tool would be manipulated in a real scene. Both virtual tools and live objects appear on the same computer monitor, but the approach is not the same as telemanipulation. The virtual tool is moved freely with no corresponding robotic programming until the operator is satisfied that a particular position and orientation is correct for a desired pick point, place point or way point. Then a directive is given to the computer to store the point in an evolving robotic program. With two such virtual paintings (one to the object to be moved and one to the place to which the object is to be moved) in the live video scene the robot can be directed to "put that there." The locations "that" and "there" have both position and orientation associated with them. The robot then automatically constructs trajectories to achieve the desired directive. In the container handling application, the operator selects a container to be moved simply by virtually touching the corresponding live video container shown on the monitor with the virtual tool (spreader tool in this case). The operator then designates, in a similar manner, the location where the container is to be moved issuing a directive to "put that there". Finally, the operator has an option to see a trial run of the designated movement in order to verify that the movement can be safely made before the robotic array is activated to move the real container on the ship. During specification of a robotic task, especially in applications such as hazardous waste remediation, where tasks are very unstructured, the depth of the virtual tool in the live video scene is visualized relative to a triangulation point specified using one or more cameras with associated depth cue information (such as surface height relative to camera height). In this case, the virtual tools recede into partial wire frame rendering beyond the triangulation depth but return to fully rendered view in front of the triangulation point so that position and orientation relative to the container can be virtually specified in the live video scene. After directing the robot to "put that there" the computer simulation feature of the system presents the operator with a preview of how the container will be moved to the destination. Obstacles that may be hit during such a trajectory cause the screen to turn red, for example, as a warning so that the operator will know to move the obstacle (e.g. another container) before attempting the first move that was found to be dangerous. Upon operator approval of a virtual trajectory, the human computer interface automatically generates robotic commands to the hardware components to begin real-world trajectory execution.

The sensors cooperate using sensor fusion techniques to provide information regarding the location and relationship of objects on the ship, on the dock, and regarding the cargo container so that the proper container is selected and moved to the proper destination precisely and without undue oscillation. The sensors include cameras, global positioning satellite system sensors, laser range finders, encoders, tension sensors, and measurement sensors for sensing changes in the roll and pitch attitude of the container. These sensors monitor and control the cable array robot operations.

One feature of the present invention is the folding, telescoping masts. Because the tips of these masts define the upper and outer corners of the cargo movement workspace, their reach, being enhanced by their telescoping design, becomes important in the ability to move cargo. On the other hand, their ability to be folded into a compact configuration, reduces their impact on the maneuverability of the ship, such as, for example, when passing under bridges, being maneuvered into port, or weathering a storm at sea. Also, the present masts seat into prepared structural supports in the deck of a ship or on a dock, making them easy and quick to install and replace when necessary. The winches are generally located below deck and can be stored in standard containers when not in use.

The end-effector is another important feature of the present invention. It performs three functions. First it couples the container to the robotic array. Second it carries sensors that, when it is coupled to the container, allow the location, orientation and roll and pitch attitude of the container to be precisely controlled. Third, it is able to manipulate the container: rotating it about a vertical axis, damping oscillations and compensating for its roll and pitch attitude, in order to achieve control on the order of centimeters.

The cooperation of the end effector's active spreader and its messenger spreader in retrieving containers from the hold is another feature of the present invention. This feature enables the robotic array to unload the hold and the deck without changes in equipment or set up time.

The graphical user interface is yet another important feature of the present invention. It is extremely easy to use, requiring little more than pointing and "clicking," while issuing directives regarding what to perform at the indicated locations. Operators can learn to use it in minutes and will achieve 30–45 container movements per hour in Sea State Three (60–90 with a double array) compared to 10 containers per hour with the present crane-based systems, which can only operate in calm seas. Furthermore, the virtual reality aspect allows a test run of each movement prior to the actual movement as a safety precaution.

The use of cameras to provide images for object recognition and positional information for object location is another important feature of the present invention. By panning and tilting the camera to align an object with the camera's cross hairs, the camera can locate an object. Using multiple cameras to triangulate on an object provides accurate positional information about an object prior to movement.

The use of sensors on the end-effector to assure that it is in position to lock onto a container and verify its position with respect to the deck is still another feature of the present invention and helps to assure that the container is securely coupled to the end-effector prior to movement. Sensors on the end-effector also allow roll and pitch attitude to be controlled, allow prevention of pendulation of the container below the spreader (from the points of cable attachment) and help to level the container when its center of gravity is not at the geometrical center of the container.

Using the differential global position satellite (DGPS) system to provide constant feedback as to where the end-effector is during movement is important, particularly when the container and the surface for which it is destined are moving with respect to each other, such as when the container is being moved on rough seas from a ship to a lighter not tethered to the ship. DGPS system provides a basic frame of reference for the movement.

Still another advantage of the four mast assemblies of the present invention is its operational flexibility. Not only can the four-mast system load and unload a cargo ship from a dock or sea-going lighter, but it can also load another ship. This can either be accomplished by overhanging the other ship, or two masts of a four-mast system can cooperate with one or more masts on the second ship to pass cargo containers between ships.

A significant advantage of the present system is that it avoids the need for large cranes, forklifts, and miscellaneous material handling equipment and support personnel. Moreover, the components of the present system can be prefabricated and transported in ISO containers themselves. Finally, the computer controller for the present system can also be used for logistics, materials inventory, operating, and accounting functions.

The present system allows readjustment of containers while a container ship is underway, for example, to prioritize the cargo for offloading operations or increasing stability of the cargo load—another significant advantage. In essence, the invention provides horizontal and rotational control authority for the first time in crane technology. This means there will be no pendulation (swing) and no undesired yaw motion (swivel) during container movements—despite ship roll, heave and pitch.

Many other features and their advantages will be apparent to those skilled in the art of cargo handling and robotics from a careful reading of the Detailed Description of Preferred Embodiments, accompanied by the following Drawings.

DETAILED DESCRIPTION OF PREFERRED EMBODIMENTS

The present invention is a cargo handling system that rapidly moves an expanded workspace with considerable precision. The preferred system is based on a computer-controlled, four-cable, robotic device operated from four, folding, telescoping masts. Winch-driven cables are deployed from these masts to an end effector that grips a container and affects movements as directed by an operator. The operator directs these movements using a computer controller that is given commands to do tasks using a graphical user interface. Each direction given by the operator is translated into the appropriate tension function for each of the four cables. Because of the coordinated use of various sensors and cameras to provide information to the computer controller, the system has sufficient control to be used on ships in sea state three conditions or higher because it accommodates the ship's roll and pitch.

The present system can be used in moving cargo containers from ship to ship, ship to dock, dock to ship, as well as within a workspace on a deck or on a dock and for other non-ocean applications. In this detailed description, the use of the present system in a ship-to-lighter example will be described but it will be clear that other applications are possible with only minor adaptation. The ship will sometimes be referred to herein as the "mother" platform when a container is to be moved from it, and the lighter will be referred to herein as the "target" platform, when it is to receive the container (although each mast assembly may be on a separate, independently moving platform). The present invention works best with a uniform set of shipping containers, preferably standard containers and most preferably those that meet the requirements of an international standards organization such as the International Organization for Standards, as promulgated by its transport container committee TC 104. However, the container itself is not part of the present invention and various configurations of container or other object, tool, pallet or sensor suite can be used with the present invention.

The present system will robotically traverse a large work area defined by three or more mast assemblies (four in the most common rectangular preferred implementation) to perform sophisticated material handling functions. This new approach features the relatively straightforward suspension of an end-effector device and its load connected by four cables to four computer-controlled winches that reel in and out the four cables deployed from the mast assemblies.

Figure 1:
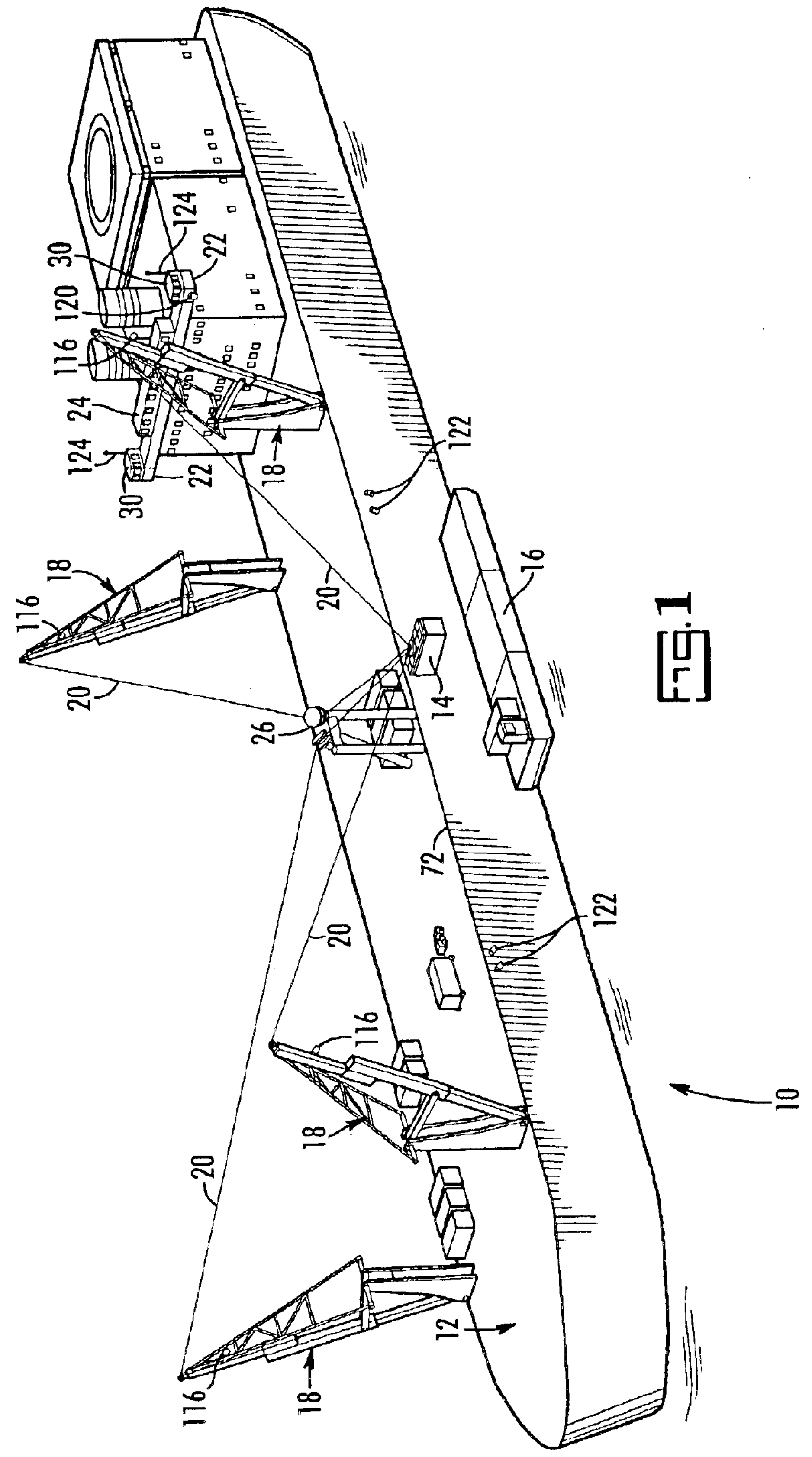
FIG. 1 is a perspective view of a cargo ship equipped with a cargo handling system according to a preferred embodiment of the present invention.

Referring now to FIG. 1, there is shown a ship 10 having a deck 12. Containers 14 located on deck 12 are being moved one at a time to a lighter 16 using four mast assemblies 18 and four cables 20, one cable running from each mast assembly. The operator of mast assemblies 18 is preferably located so that he or she will have a good field of view of deck 12, such as at the end 22 of bridge 24. A fairlead 26 is also mounted to the same side of deck 12 of ship 10 to facilitate off-loading of cargo containers onto lighter 16, as will be described presently. From end 22, an operator can see all of deck 12 as well as the side of ship 10 down to lighter 16.

Four mast assemblies 18 are erected adjacent to the proposed work site, preferably at its four corners but not necessarily at the corners of a rectangle or square. As long as the work area defined by mast assemblies 18 forms at least a triangle, mast assemblies 18 can be used to affect movements. Preferably, however, the work area is a quadrilateral, and, most preferably, a rectangle wherein the major and minor sides are not too dissimilar in size. Hexagonal arrays and higher order multi-cable arrangements are envisioned for open pit mining and other applications involving non-rectangular work spaces. At any time, three cables are primary regardless of configuration, and additional cables essentially just carry sufficient tension to keep from going slack. Each cable run from the mast assemblies beyond three primary cables carries a portion of the load while the primary three cables control container 14. There is no fundamental difference between a 4-cable or n-cable arrangement except for slight logistical handling of additional terms in the finite state machine of the software. Double or triple sub-array systems are different from n-cable systems in that each sub-array in such an arrangement works independently from any other sub-array. However, two or more sub-arrays may use the same mast structure to suspend multiple pulleys used in the respective sub-arrays.

Mast assemblies 18 are preferably prefabricated and installed as units in mast support structures 34 designed and built not only to hold them in place but also to minimize torsional movement (see FIG. 2D); that is, mast support structures 34 in which they are installed must hold them stiffly. Mast support structures 34 are essentially strong frameworks, preferably made of steel or other metal alloy secured to and embedded in deck 12 or in a dock. Mast support structures 34 or mast assemblies 18 themselves can be embedded in concrete for additional stiffness. Mast assemblies 18 can be inserted into mast support structures 34 that have been previously constructed and installed. Replacing mast assemblies 18 is therefore simplified. Simply by removing them from support structures 34 and installing a replacement mast assembly 18, connecting cables 20 to winches inside of base 36 (or next to base 36) and running cables 20 over mast assemblies 18, mast assembly 18 becomes operational. The internal winches control the tension on cables 20.

Winches 38 may be contained within base 36 or positioned adjacent to base 36 as a modular assembly, perhaps contained in a standard ISO cargo container. Winch control can be written using standard software applications, such as CONTROLSHELL, which is adequate for the present application and the environment of use. Winches 38 may be direct drive motors, hydraulic winches or hybrid winches.

Figure 2A:
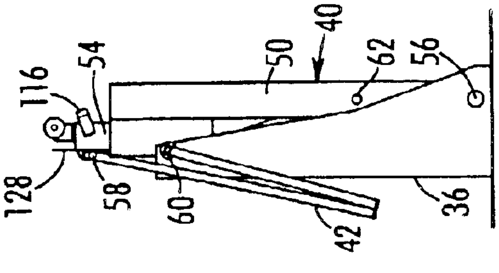
FIGS. 2A, 2B, 2C and 2D illustrate a mast assembly in the folded, unfolding, unfolded, and lifted positions, respectively, according to a preferred of the present invention.
Figure 2B:
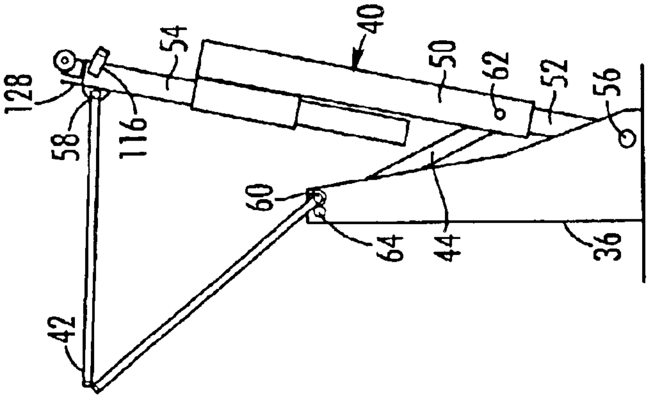
Figure 2C:
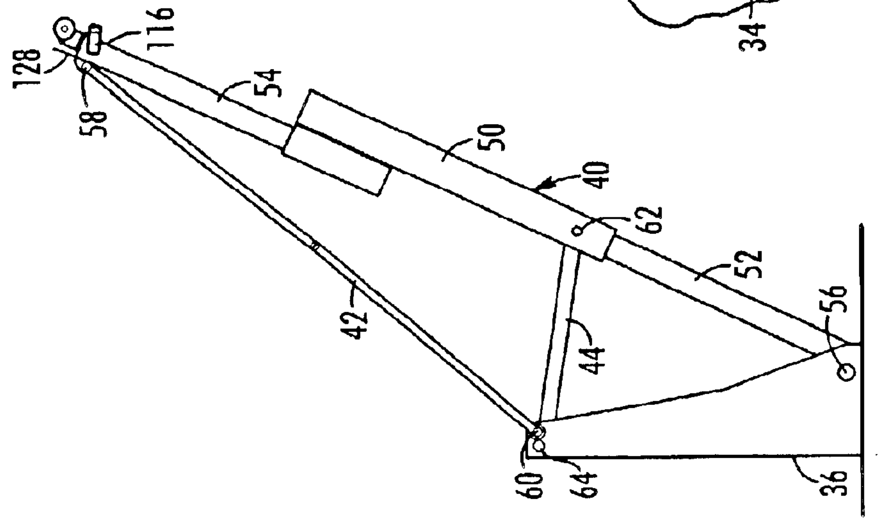

Mast assemblies 18 are preferably telescoping and folding (see FIGS. 2A–2C). Specifically, they are designed to have members that can be raised telescopically and pivoted with respect to each other so that the tip of the mast extends to a height suitable for lifting and moving the intended container 14 to the desired location in the work area. In the present example, mast assembly 18 has base 36, a telescoping arm 40, a folding backstay 42, and a lateral brace 44. As telescoping arm 40 is extended, backstay 42 unfolds, and lateral brace provides additional support between base 36 and telescoping arm 40.

Telescoping arm 40 has a boom 50 with a lower extension 52 and an upper extension 54. Both lower extension 52 and upper extension 54 telescopically extend from boom 50. By telescoping, it is meant that the lower and upper sections 54, are slidably receivable, coaxially, at least partly within boom 50. By sliding boom with respect to lower and upper sections 54, mast assembly 18 may be deployed from its stored position to its extended positions. Lower extension 52 is pivotally joined to base 36 at pin 56. Upper extension 54 is pivotally joined to backstay 42 at pin 58, while backstay 42 is also pivotally joined to base 34 at pin 60. Lateral brace 44 is pivotally joined to boom 50 and to base 34 at pins 62, 64, respectively. By virtue of its construction with these pivot points, mast assembly 18 may be extended to a point beyond the deck of the ship on which it is mounted, that is, outside the "foot print" of base 34, as shown in the sequence of FIGS. 2A–2C. Furthermore, mast assemblies 18 that can be raised well above the highest container lift point will require less tension on cables 20 because the horizontal component of the tension forces will not be as great when the tips of the mast assemblies are high as when they are just above the maximum height of a lift. Also, when in their extended positions, the tips of mast assemblies 18 are farther apart than when in their stored positions.

The movement that takes place as mast assembly 18 unfolds begins when boom 50 extends its lower and upper extensions 52, 54, respectively. Lateral brace 44 causes boom 50 to move away from base 34, and upper extension 54 begins to unfold backstay 42. Maximum height of mast assembly 18 is reached when backstay 42 is completely unfolded.

Mast assemblies 18 that can move between a folded or stored and an unfolded, deployed configuration have several advantages over those mast assemblies 18 that do not have this capability. A mast assembly that can be folded is easier to transport and when installed on a ship, will be less likely to interfere with bridges, power lines, dock features and other structures than mast assemblies that do not fold.

In addition to four mast assemblies 18, for use on a ship, fairlead 26 assists in some container movements, namely, those when the destination is off the side of ship 10. Fairlead 26 comprises a frame 70 attached to the edge 72 of deck 12 (FIG. 1) and having two spaced apart pulleys 76, 78, mounted thereon. Pulleys 76, 78, are situated parallel to the side of the ship but their axes are not parallel either to each other or to the side of the ship 10. Rather, they are canted so that, as container 14 passes between lines defined by the vertically upward projections 82, 84, of frame 70, and then is lowered, two cables 20 from mast assemblies 18 on the opposing side of deck 12 are received on the rolling circumferences of pulleys 76, 78, and thereby captured by pulleys 76, 78. The purpose of fairlead 26 is then to be able to lower container 14 to a location off deck 12 and below deck 12 by providing a set of direction-changing pulleys 76, 78, at edge 72 of deck 12. Otherwise, cables 20 from the two rear mast assemblies 18 would ride over edge 72 of deck 12.

Figure 2D:
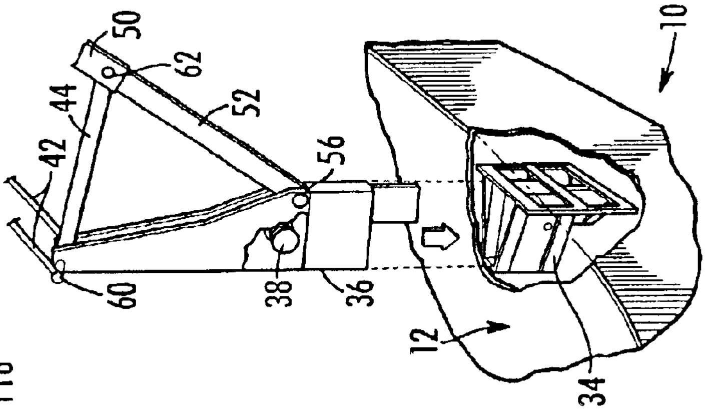
Figure 3A:
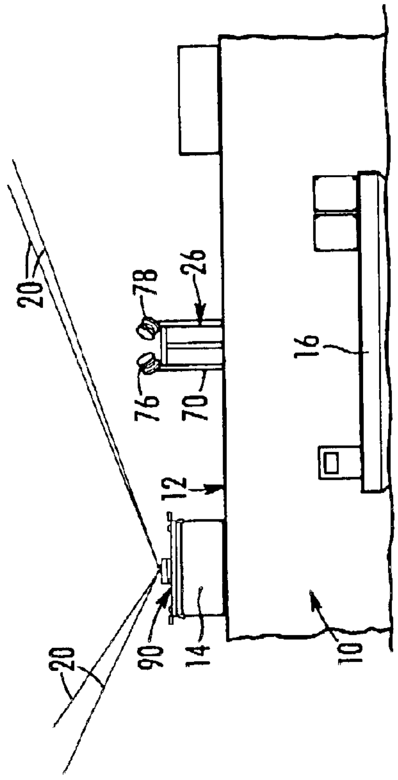
FIGS. 3A, 3B, 3C, and 3D illustrate the operation of a cargo handling system in lifting a cargo container from the deck of a ship and moving it to the deck of a sea-going lighter, according to a preferred embodiment of the present invention.
Figure 3B:
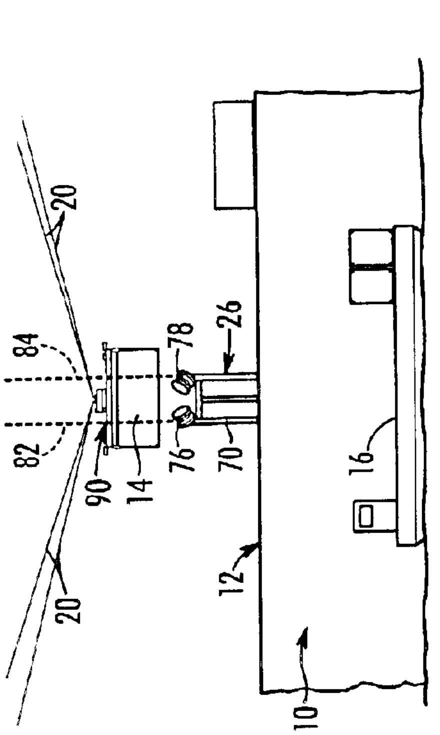
Figure 3C:
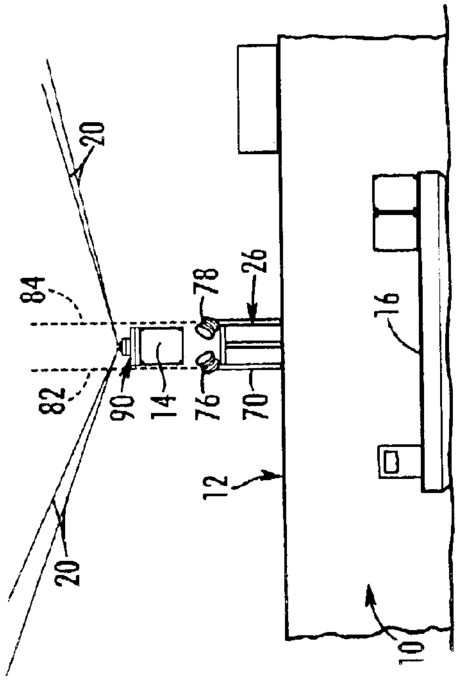
Figure 3D:
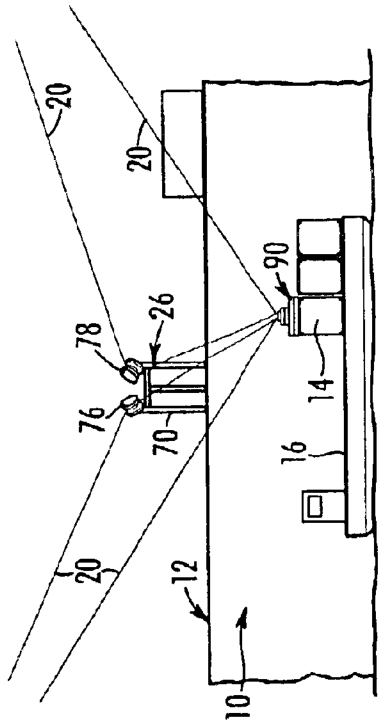
Figure 4:
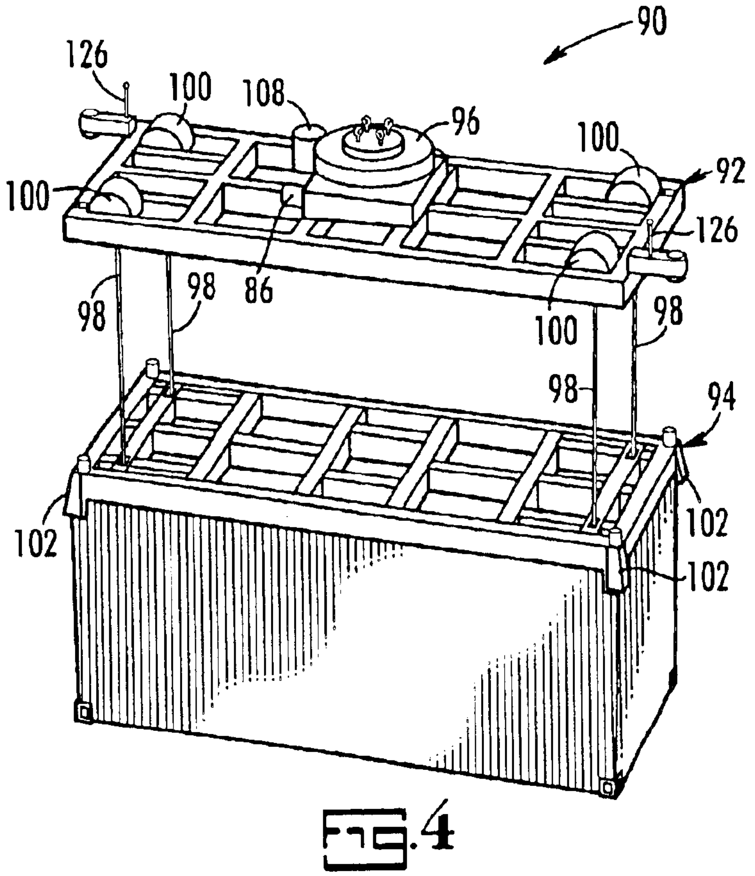
FIG. 4 illustrates in perspective a spreader with a messenger unit holding a cargo container, according to a preferred embodiment of the present invention.
Figure 5:
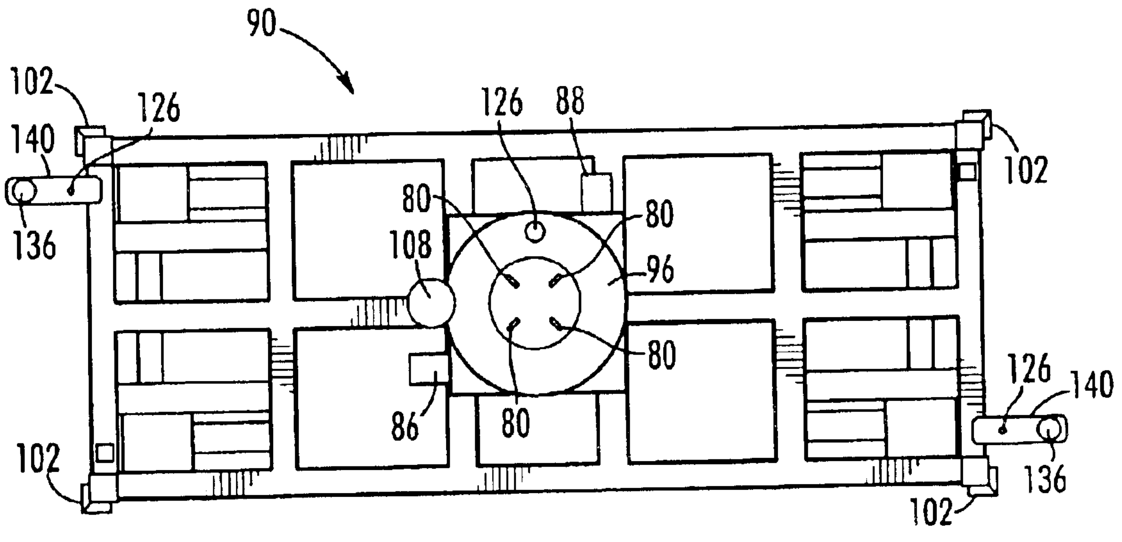
FIG. 5 is a top view of a spreader, according to a preferred embodiment of the present invention.

FIGS. 2A–2D illustrate the process of moving a cargo container 14 using the present system. The process begins by locking an end-effector 90 (to be described more completely below) to the corner castings of container 14 on deck 12 (FIG. 2A). Container 14 is a standard, 20-foot, ISO container but, with suitable modification, the present system can be adapted to move any uniform set of containers. End-effector 90 targets the corner casting holes of container 14 for insertion of its locking pins when being lowered down to container 14. These holes are "seen" using the vision and/or laser sensors carried by the end-effector 90 and recognized using object recognition software programmed into the computer controller. End-effector then lifts container 14 using cables 20 from four mast assemblies 18 (not shown in FIGS. 2A–2D), moves container 14 until it is over fairlead 26 and between projection lines 82, 84 (FIG. 2B), rotates container 14 by 90° (FIG. 2C), lowers container 14 so that two of the four cables 20 are caught by pulleys 76, 78, and then adjusting tension to all cables 20 to lower container 14 onto lighter 16 (FIG. 2D). Typical time for movement of a container 14 from deck 12 to lighter 16: 80 seconds. This is considerably faster than ship cranes currently in the field. In the context of coordination logistics, such as when a lighter is not in position due to standing off because of a captain's orders etc, an adjustment factor may be added.

There is another occasion during which mast assembly 18 must reach below the level of deck 12. That occasion occurs when container 14 is in the ship's hold. In order to bring a container 14 from and deliver container 14 to the hold, end-effector 90 has two parts: an active spreader 92 and a "messenger" spreader 94. Messenger spreader 94 is held to active spreader 92 by four cables 98 operating off four small winches 100. Winches 100 operate in unison when lowering and raising messenger spreader 94 into the hold so that messenger spreader 94 remains generally parallel to active spreader 92. The lower corners of messenger spreader 94 are fitted with guides 102 for locking onto container 14.

In an alternative preferred implementation, the main winch motors are used instead of carrying four small motors on the messenger spreader. This is accomplished by doubling the main cables back to a second drum on the main winch motor that drives it. With clutching, the two drums, wound in opposite directions, can at one time drive the cable in normal mode to increase and decrease the length of the cable, yet at another time cause the cable to run in a looped mode, that is, in "clothesline" mode, so that there is no change in length, only rotational movement of the pulleys at the spreader then results. By wrapping secondary cables to drums on these rotating pulleys, the main winch can thus raise and lower the messenger spreader. Those skilled in rigging cables will appreciate that there are many alternative ways of connecting cables between winch, mast and end-effector.

Active spreader 92 includes a rotator 96 for rotating end-effector 90 about a vertical axis, and a motor 108 for effecting the rotation. Rotator 96 has four eye bolts 80 to which cables 20 are secured. Additionally, active spreader 92 has two screw jacks, an X screw jack 86 and a Y screw jack 88 that adjust end-effector 90 to compensate for the center of gravity of container 14 being off center of container 14 or pendulation of container 14. If one side or corner of container 14 is hanging lower because of the container's center of gravity is not centered, screw jack 86 and/or 88 will be adjusted so that container 14 is level. For more active attitude control as may be required in higher sea states (e.g. above sea state three), a four bar linkage mechanism is driven to cause the container to rotate at or near its instant center. With this arrangement the speed of lighter roll motions can be matched during container landings.

Mast assemblies 18 and end-effector 90 may be made of metal, metal alloys or of composite materials having suitable strength but reduced weight.

Figure 6A:
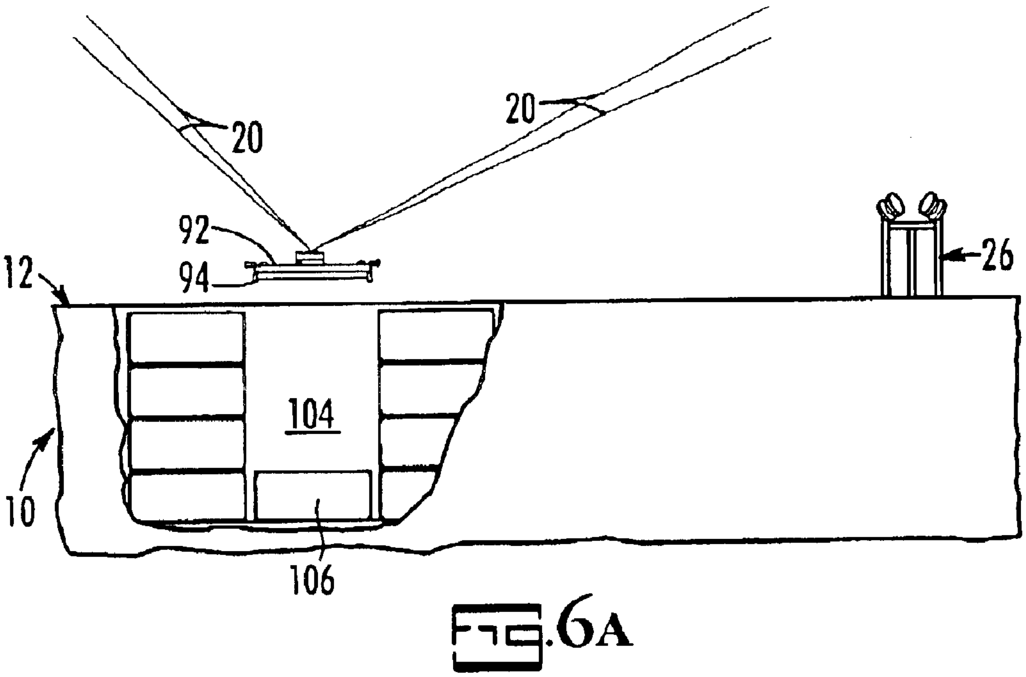
FIGS. 6A, 6B, 6C, 6D and 6E illustrate a sequence of view of the spreader and messenger removing cargo containers from the hold of a ship, according to a preferred embodiment of the present invention.
Figure 6B:
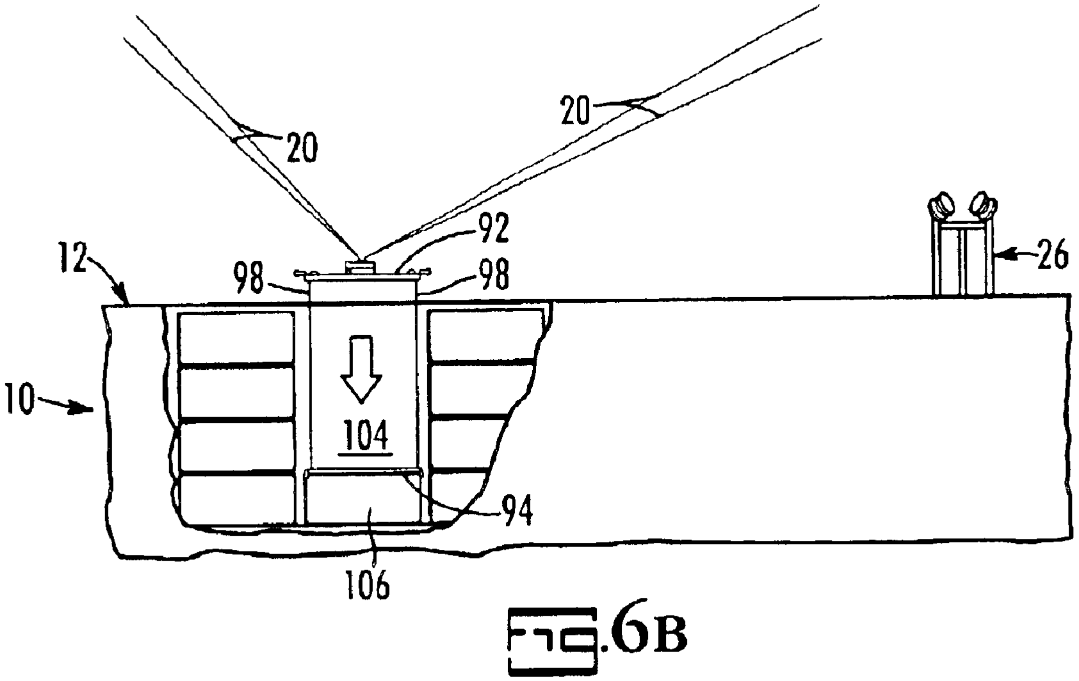
Figure 6C:
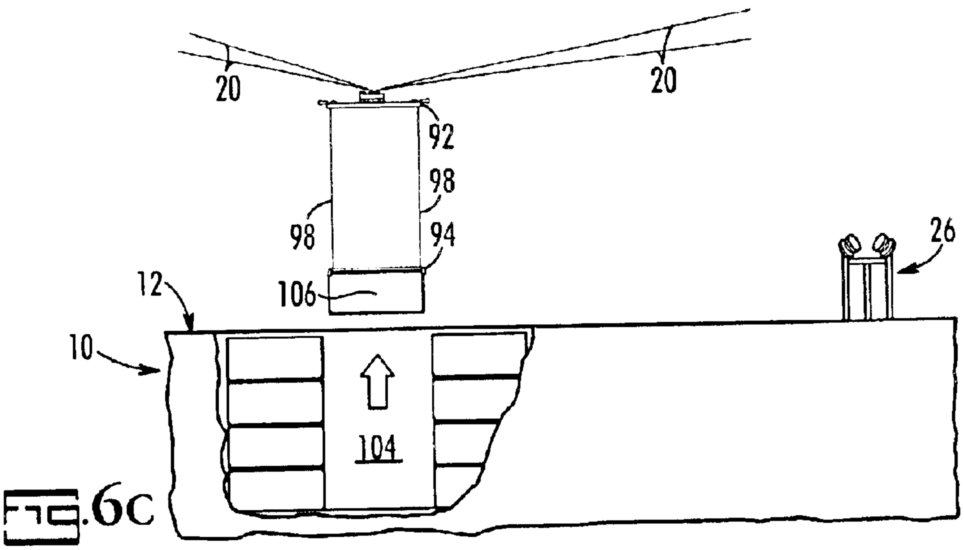
Figure 6D:
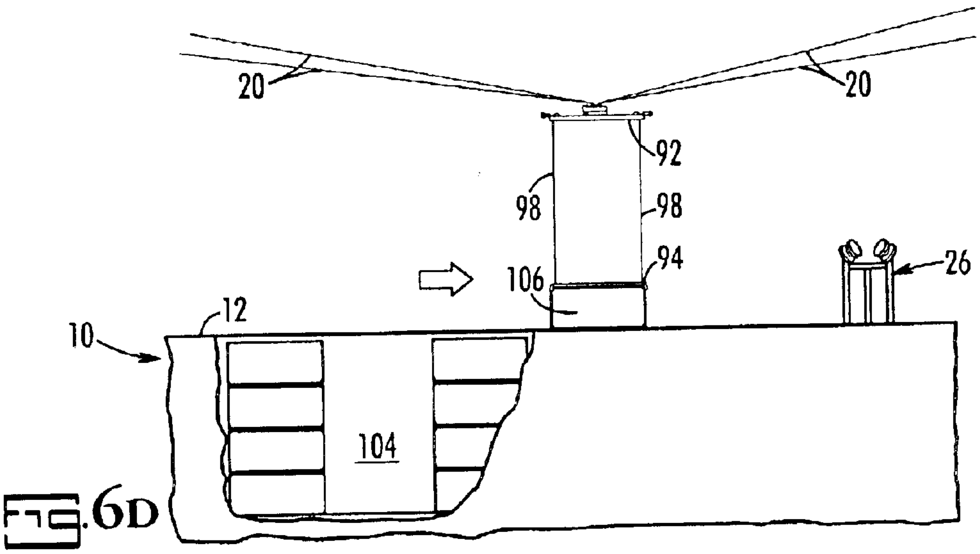
Figure 6E:
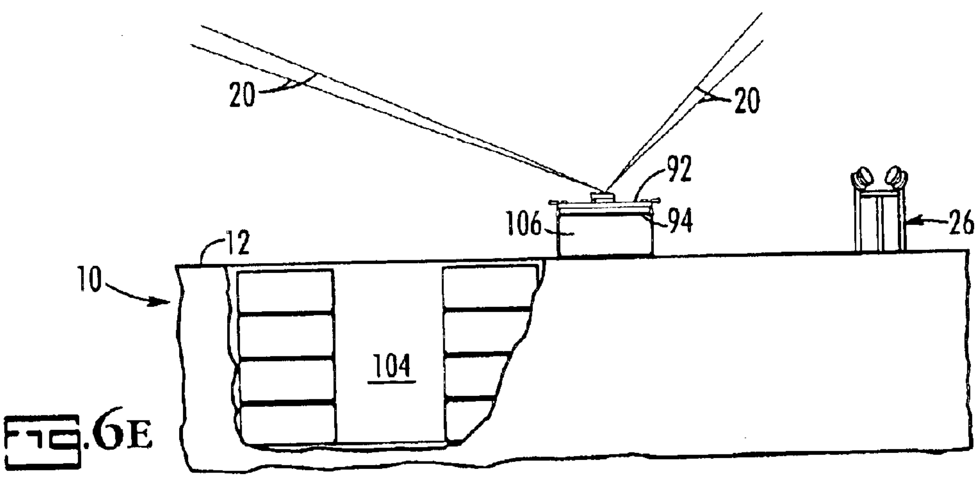

In operation as illustrated in FIGS. 6A through 6E, end-effector 90 is moved by the combined tensions on cables 20 to place it over the hatch leading to hold 104. Hold 104 contains a number of containers 106, one of which has been positioned directly below the hatch over hold 104 (FIG. 6A). Active spreader 92 dispatches messenger spreader 94 into hold 104, using winches 100 and cables 98. Messenger spreader 94 latches onto container 106 (FIG. 6B). Active spreader 92 then lifts messenger spreader 94 and container 106 clear of the hatch and above deck 12 (FIG. 6C), translates it laterally to a clear area of deck 12 (FIG. 6D), and then lowers it by cables 20 as its own winches 100 reel in their cables 98 until active spreader 92 latches onto messenger spreader 94. At that point the further movement of container 106 to lighter 16 follows that described in FIGS. 3A–3D, above. Typical times for container movement from hold 104 to lighter 16: 115 seconds plus any pertinent logistics factors related to intruding personnel in the work-space or absent lighters, for example.

An important aspect of the present invention is the combination of sensors and cameras that provide information to the operator and computer about the geometric relationship of container 14 and its surroundings. For example, each mast assembly 18 includes a wide-angle camera 116 located near the tip on upper extension 54. Each operator's cab 30 also has a wide-angle camera 120. Cameras 116 and 120 are capable of night-vision operation so that loading and unloading may take place round the clock. In one embodiment, a mouse click in one or more camera views, using the mouse as a pointer in the interwoven reality scene, is sufficient to specify a location. If only one camera is used, then the height of the container above or below deck must be known or separately specified. Each camera 116, 120 in the moving multi-camera case, has cross hairs on its field of view for accurate sighting and can pan and tilt to align the cross hairs on an object. When multiple cameras are targeted on an object, its location can be accurately determined by triangulation. Image processing can also be used to triangulate if cameras remain stationary.

Cameras 122 are also mounted to the side of ship 10 so that operations on lighter 16 can be observed. A vision system performs edge detection on a view of the lighter to determine proper container landing angles if the lighter is standing off at a skewed angle as during dynamic positioning or when excursions away from bumpers take place.

Sensors for a Global Positioning Satellite (GPS) system, include antennae 126, 127, 128 for the GPS which are located on cab 50, on end-effector 90, and on mast assemblies 18, respectively. Antennae 126 on end-effector 90 are a pair; one on each end and preferably at opposite corners to determine roll and pitch attitude during free travel. Antennae 128 on mast assemblies 18 helps to identify the position of mast assembly 18 which can then put input to the control algorithms and use to produce cable lengths for each cable 20. By being able to tell where end-effector 90 is with respect to cab 30 or some other point on ship 10, the computer can tell where end-effector 90 is with respect to any mast assembly 18 or hold 104. Although the location of container 14 relative to a fixed point on ship 10, for example, can be determined by cameras 116, 120 and 122, and position during landings can be determined by laser ranging, GPS can be used to determine the location of container 14 with respect to a point well off the ship, namely, a satellite. Thus, if ship 10 is moving, such as it will during sea state three, the extent of that movement (i.e. absolute movement) can be known using GPS in an inertial reference frame.

The system further comprises a separate visual serving system for identifying key localized object features and for then moving end-effector 90 to a desired position relative to those features in an orientation feedback control loop (e.g. for automatically landing the locking pins of end-effector 90 into corner holes atop container 14 during a robotic "pick-up" operation. The visual serving system uses a centroidal profile technique that finds the centers of features (e.g. the corner holes on the top of a container) by calculating moments (1st, 2nd, . . . nth) that characterize features of container 14 in a way that is invariant to orientation and scaling changes, such that these features, and their centroids are recognizable regardless of whether the camera is rotated (change of orientation) or elevated (change of image size) relative to the features of interest (e.g. the container holes for docking), and for which the yaw control portion of the control system reduces the error between visually determined feature centers (e.g. said centroids) and the desired location of those feature centers during a docking maneuver, while the error becomes small, and end-effector 90 is lowered into position for docking (e.g. to allow container 14 to be picked up), including one or more iterations in which progressively closer "pounce positions" are achieved so that additional image processing and servoing can take place at locations ever nearer to container 14 for improved precision.

The system also includes a range-finder such as a laser range finder carried by end-effector 90. The range-finder determines distance from end-effector 90 to a surface, with the range finding techniques used in an automatic feedback control loop to adjust position and orientation of loaded end-effector 90 relative to the placement platform during a robotic "place" operation, with a minimal implementation of the laser servoing system calculating relative distance between the end-effector 90 as the average of multiple laser readings in order to reduce the error between current distance and desired distance to zero, and the preferred implementation using two or more laser readings to calculate the attitude of the target platform (i.e., lighter 14) with respect to the "mother" platform (i.e., ship 10) to reduce errors in attitude between end-effector 90 and the target platform to zero using proportional, derivative and related algorithm components, and with the maximal implementation using laser range finders to identify features of the target platform by reverse engineering (e.g. to determine deck hole location) so container 14 is placed in exactly the right place (e.g. on advanced lighters with docking holes embedded in the deck). This multi-laser range finding system determines roll, pitch and heave of the target platform relative to end-effector 90 and feeds this sensor data back to the computer controller so that a suitable trajectory command can be created by both the portion of the controller for heave compensation as well as the portion of the controller for the roll/pitch actuator(s) on end-effector 90, container 14 thus rolling and pitching in unison with the deck while its height above the target platform is heave compensated, while both said mother platform and said target platform move at once with relative motion information gathered by the lasers regardless of how the mother platform (e.g. ship 10) is excited and regardless of how the target platform (i.e., lighter 10) is excited.

The system has global positioning system (GPS) sensors that track absolute position of end-effector 90, the tips of mast assemblies 18 and the decks of ship 10 and lighter 16, and any other vessels involved in the container handling operation. The fusion of the sensor input by the computer controller allows GPS signals, and in particular carrier wave Differential Global Positioning System (DGPS) techniques, to be used to verify absolute positions (at least relative to a point sufficiently from the decks to make position determination virtually absolute) and to confirm that laser readings are not erroneous. High accuracy in end-point sensing (e.g. 1–2 centimeter) in said feedback control loop is obtained during container handling pick and place operations. The combination of one or more of the sensor systems allows the end-effector 90 to be tracked precisely including compensating for stretching of cables 20 or other deviations from predicted motion.

The system also includes wave prediction algorithms based on use of neural networks trained, in situ for sea state conditions at the time of operations. Neural networks is a term common in the prior art for software applications that have algorithms designed to process a set of inputs in combination in order to produce a set of outputs. The inputs in this case are sets of coordinates in space that represent movement of ship 10 as a result of wave action. The outputs are sets of coordinates in space that represent the "next" position of ship 10. These wave prediction algorithms are used to anticipate base excitations and to create a precursor display on the operator console to adjust container landings onto the target platform (i.e., lighter 16). Neural networks, in this context, are trained throughout the major part of the container trajectory prior to setting container 20 on lighter 16, and for which, in a "pounce" position just prior to set-down, the neural network is switched from training mode to prediction mode. The prediction is accurate for 20–30 seconds, but this is sufficient time to use the information to calculate an optimal window for lowering container 20 onto lighter 16 with minimal impact loading at the time of contact between container and said lighter.

The system includes an automated stowage and retrieval system for end-effectors 90. This stowage system is comprised of docking stations and cable handling trolleys that hold each end-effector 90 securely and return individual cables 20 to the base of their respective mast assemblies 18 for stowing during periods of extended non-use, maintenance or repair.

Each end-effector 90 has, in addition to antennae for GPS, two vision cameras 136, 138, one on each end, preferably at opposing corners. Cameras 136, 138, preferably pivotable on short arms 140 so that they can be stowed in a more compact configuration when not in use and swung out and directed downward for use to sense features on the containers during orientation of the end-effector for picking up containers. There are also two laser range finders 134, located adjacent to cameras 136, 138 mounted in similar fashion for use when end-effector 90 is approaching a surface, such as deck 12. Although cameras 136, 138, can enable the operator to see deck 12 and container 14, laser range finders 134 can measure distance and therefore inform the operator and computer controller when docking between end-effector 90 and container 14 will occur.

A machine vision system 222 is also included on end-effector 90, carried on short arms 140, for looking at shapes. Its output is fed to computer controller so that computer controller can determine the location and the centers of the locking holes standard on ISO 20 containers. Although cameras 136, 138 are used to orient end-effector in rotation during pick up of container 14, machine vision system 222 cooperates with cameras 136 and 138 providing in part redundant data to computer controller 200 to help it to move end-effector into position over container 14 so that guides 102 latch onto container 14 properly.

Advanced point-and-direct software and graphics control technology, employing virtual tools is ideally suited for combining mast assemblies 18 and end effector 90. This technology, which has been in existence for over a decade, means that a human operator points to a destination, for example, and directs a robot to do something at that destination with a tool. The robot must be programmed so that it can figure out how to get to the destination by itself with a tool, and then to consult the attributes of the virtual tools to know what to do with the tool when it gets to that destination. The present invention includes virtual tools (i.e., graphic representations of real tools) and control algorithms. The attributes of the virtual tools are embedded into the graphical representations so that when the graphical representation is moved to a designated location, while giving a directive, the attributes follow. Thus, the robot knows what to do at the specified location. The designating of a container 14 or a destination for it can be specified by using a computer "mouse" (pointing and clicking), voice command, instrumented glove or by macros or task protocols previously generated and stored on a digital storage medium such as a compact disc. The computer controller then transforms this command information into position coordinates and constructs the graphic movement trajectory for the operator to preview. If satisfied with the previewed movement, the operator then issues an "execute" command, which causes the computer to automatically construct the movement tasks and perform the container movement or series of container movements. The operator is not required to preview standard task movements. The present computer controller can be programmed to accommodate the differences between inboard operations (reordering cargo containers on the ship) and outboard operations (ship to dock movements or ship to ship) since these two modes of operation carry with them different cable tensions and protocols.

Point-And-Direct (PAD) tele-robotics, in which a human operator points to locations in order to give directions for actions to be performed at those locations, was first introduced by one of the present inventors, when he was principal investigator at Stanford University in the late 1980's. This concept allows the human operator to interact with robots using simple, high-level directives such as "move that there" initiated by a keystroke, a gesture, or verbal command while a destination is targeted in a live scene. The initial Stanford PAD tele-robot demonstrated, for the first time, that a human operator could successfully direct a robot to perform tasks in an unstructured environment while graphically interacting as a supervisor to specify end points rather than specifying whole telemanipulative trajectories.

Use of this technology enables the operator to reduce manual control time by an order of magnitude, while providing the ability to perform a test run, to "look before leaping" before the actual movement of container 14 takes place; the test run verifies that the instructions are understood by the computer and are physically possible prior to any action being taken. In use, the operator directs robotic actions in an interactive manner without relying exclusively on either tedious tele-manipulation or autonomous machine intelligence as the sole modes of operation. Virtual tools enable an operator to specify attributes and actions in a natural way that is remarkably easy to master. Operators can learn the present system in minutes, for example. The full tele-robotics continuum is utilized in the present invention to provide the interactive advantages of tele-manipulation and the predictability of autonomous subroutines. The result is improved safety, increased productivity, and a greater ability to adjust to the inherent lack of structure of a dynamic environment. The operator need not master the kinematics of a complex robot before directing it to put its end-effector in a particular position and orientation.

In the present system, an operator interacts with the computer controller through a user interface that includes a workstation with a monitor on which real-time video is displayed with attribute and movement data superimposed over the video. Additionally, the computer controller can display on the monitor such information as; X, Y, Z coordinates, cable tensions, virtual tools to perform manual or repetitive robotic movements, graphic inventory and movement records, container center of gravity information, weather data, and other information useful to the operator. Differential global position satellite (DGPS) system and laser or video images with pattern recognition software to enhance and expand the images, reliable remote operations requiring great dexterity at considerable accuracy can be accomplished at great distances from the operator including operators working as remote internet collaborators who see the same scene but are located elsewhere in the world. Operation during poor visibility can also be augmented with one or more cameras mounted on the Active Spreader end-effector and the use of night vision cameras and other sensors there and elsewhere. For viewing of the graphic images necessary for the operator to make the movement decisions, a standard PC with suitable interactive video is now sufficient and a high-resolution liquid crystal display flat panel monitor is preferred.

The present invention employs an efficient, minimalist approach to the graphics. This approach takes advantage of live video to provide scene detail. This combination of live video and minimalist graphics is the basis for establishing this intersection between physical and virtual reality, which we call interwoven reality. The correlation plane, in which the virtual and physical view coincides, and through which a virtual tool may pass, is oriented vertically in the scene and normal to a horizontal projection of the camera's line-of-sight. The virtual tools are rendered as solid objects in the scene as long as they move in front of this correlation plane, but they become progressively "wire-frame" rendered as they pass into and behind the correlation plane. This allows virtual tools to simulate real tools that become obscured by the object during interaction behind the object. Using this interweaving of solid and wire-frame representations of objects as a depth cue, the operator can place virtual tools in the depth-correlated scene relative to objects of interest. Then, directives such as "put that there" can be issued as a function of tool placement and the operator's hand gesturing.

Once the operator targets an object, causing plural cameras (mounted on one or more perimeter masts or towers) to pan and tilt so that their axes are aligned with an object as indicated by seeing the object in the cross hairs of the cameras' images, as viewed in the monitor of computer controller, either the encoded angles of the two cameras are utilized for triangulating the object's coordinates, or the cursor location on the screen(s) is used to calculate position and depth. It is to this position and depth that the virtual tool pops into view when a virtual tool is selected from the virtual toolbox menu. In the case of container handling, the virtual tool used is usually a graphic representation of the spreader or a generic simplified icon that looks like a hook for picking things up. In open-pit mining, the VR tool looks like a mining bucket and in hazardous waste handling it is one of a number of excavators and grippers.

If, for example, the operator selects the virtual gripper tool from his virtual toolbox, this tool appears in the video scene displayed with its center at the pan/tilt camera triangulation point (e.g. a cylinder or whatever object the operator targeted). When the virtual gripper tool is selected, the gripper pads appearing on the tool partially penetrate the correlation plane and are therefore partially wire-frame rendered when they first appear. As the operator "reaches in" with the animated hand and clenches the instrumented glove to grab the virtual gripper, he or she then controls the tool's position in the graphic workspace in relation to an object of interest in the live scene. The operator may slide the tool to the point where he or she perceives the center of the object's section. If that is where the grasp is to take place, the tool is then released in an orientation or pose wherein the robot will be able to make a safe grasp.

Satisfied that the grasping pose is reasonable, the operator unclenches his instrumented glove to achieve tool release. The operator is then free to think about how the robot will execute the task and, if desired, run a simulation preview, while the object remains in the grasp of the tool. If the operator has a change of mind about how the object should be handled, the process of grabbing the virtual tool and moving it can be repeated. When satisfied that the task will execute safely, the operator makes a trigger pulling gesture with his index finger and the robot executes the task sequence with the position and orientation of the virtual tool entered as a "pick" point. For simple tasks, like specifying a large container for retrieval, a single mouse click in the interwoven graphic/video view is sufficient to designate the task.

After specifying a task, the operator is able to see a virtual reality simulation of how the container or other payload will move from its starting location to its destination. First, the virtual reality representation of the container moves to coordinates above the container and lowers itself to a pounce (hover) position. Then the graphical active spreader lowers itself, "docks" with the container, and raises it off the deck in simulation. Next, the active spreader (now holding the container) ascends to the plane designated for cross-ship traverse. In this plane, moving at full speed, the active spreader/container then moves to coordinates above the destination and descends to the hover position above the destination (i.e., the pounce position above the lighter deck). Finally, the active spreader lowers the container to its destination position, unlocks the container and rises safely. The database is then prepared for updating to reflect the new coordinates of the container and to erase its graphical image from the previous location. Upon trajectory execution, database updates are made.

If there are any obstacles in the way of the "pick", traverse, or place stages of the trajectory, the simulated images indicate the potential interference (in the high-end TeleGrip instantiation), such as by turning red and announcing a collision. The operator is then able to reroute the container out of the way to insure a collision-free path before again attempting the maneuver. At all times, the operator is able to compare the virtual reality model with physical reality by viewing the scene from a live camera view. A snap-view button is provided to render the virtual reality model from the corresponding camera angle view for ease of comparison between virtual reality and the true scene. In virtual reality, however, the operator may also look from angles other than those for which a camera view is provided by using the cruise functions provided, when these alternative views may be enlightening, in the software application.

After visually verifying that a collision-free path has been designated, the operator issues the execute command. The real spreader then proceeds to duplicate the path taken by the simulated spreader. As in the simulation, the active spreader, now real, moves into position for the initial pick operation, descends to dock with the container, rises to the traversing plane, moves horizontally to coordinates above the destination, and then descends to deposit the container at the desired placement destination.

After the operator specifies the container start and end positions, used to construct a movement task list, operation then proceeds using sliding-mode, control algorithms that issue signals to each of the four main winches thereby affecting container movement. The control algorithms include plural, closed-loop, nonlinear and adaptive software algorithms that are robust to variations in the parameters of the system and objects manipulated. These control algorithms are designed to fit container movement dynamics, including cable elasticity considerations while being robust to weight differences and other parameter variations involving container and system changes. Among the accommodated dynamic specifications are loads, accelerations, cable stresses, structural stresses and other factors. As a typical move progresses, data from the differential global position satellite (DGPS) system, laser rangefinder and other sensors are continuously being fused to generate updates that are used to correct the trajectory.

The final, specified point in any sequence is considered to be a destination (i.e. a place point in pick and place terminology). The operator can therefore specify multiple actions such as the movement of several objects. In the case of multiple objects to be manipulated, the robot will interpret the sequence of triggering gestures as direction to "put 'that' and 'that' (and however many other 'thats') . . . 'there'."

Alternatively, the operator merely needs to: point to a container to be moved; then point to the destination location on the operator's screen; and finally the computer will robotically execute the move. This ability is achieved within the commercial off-the-shelf CONTROLSHELL (Constellation by Real Time Innovations) software environment where new components plus robust/adaptive control algorithms are developed for complete robotic move scenarios.

There are four software "suites" within the system: a virtual tool graphics interface ("point and direct") suite; a database suite; a winch robust/adaptive control algorithms suite; and an end-effector and sensors suite. In the preferred implementation, the first of these is developed within an application such as Deneb's TELEGRIP/ENVISION ROBOTICS package for rendering. A graphical user interface (GUI) that does not require such an expensive package was also created for all but the execution preview function. The second suite is based on Microsoft's ACCESS for database management, although other software packages could be used instead. The preferred robust/adaptive program is written within CONTROLSHELL (Constellation) by RTI or equivalent. The preferred robust/adaptive software application considers the container movement dynamics, including loads, accelerations, cable stresses, structural stresses and other factors. As the move progresses, data from a global position satellite (GPS) system, built by Trimble Navigation, or by radio frequency beacons, and image understanding system provides updated and corrected information. Machine Vision Algorithms are developed to interface with Aphleon by Amerinex. Software. Drivers for each of the other sensor systems are provided by or developed in conjunction with the respective manufacturers.

The design of the virtual tools is such that a group of remote collaborators can use them in a shared environment. Pan-tilt camera units are mounted at the tip of one or more masts to provide full viewing by collaborators. An internet/intranet video and voice conferencing connection allows continuous command and control communication between primary and remote sites during collaboration, where collaborators can be anywhere on the world wide web such as a Navy command and control headquarters where specific container selection requests might be made.

Each remote operator, in collaborative control, is concerned with a different facet of an operation—just as experts before a space launch look at different aspects of a complex mission. All collaborators will be able to "look before leaping" using the virtual tools; i.e., robot simulation previews, based on the virtual tool's specifications, can precede the initiation of any real-world action.

The computer, through a controller, provides discrete power to each of the mast assembly cables 18 thereby effecting the coordinated position and motion of end-effector 90 in response to the position coordinates specified by the system computer. The computer determines motor torques corresponding to the set of tensions on the four cables 20 as a function of time to effect the movement. Location of container 14 thus becomes a result of four tension variables and one time variable that translate into position of the end-effector as a function of time.

The present system has great potential for moving heavy cargo in the range of 55,000 lbs. at a rate of 240 feet per minute within a large work area. The redundancy associated with four cable/wire rope systems (which makes possible large rectangular work areas) is solved by a new approach that combines constrained dynamic systems and the force distribution method. The concept of constrained motion or force/position control of a robot is first applied to reduce the variables of the dynamic equations to three variables. Next, the cable tensions for certain configurations that are subject to specific objective function are solved. A preferred embodiment specifically achieves position control for three cables while maintaining sufficient force, under force control fourth cable, to insure that the fourth cable never goes slack.

The concept of applying constrained motion for the four cable large array robot involves making three cables work as actuators to perform tasks, while the fourth cable tension is conceptually treated as the desired constraint force for the task. From the concept of force/position control of a robot, in other words, three arbitrary cable tensions are regarded as performing the position control, and the forth cable tension is essentially treated as performing force control.

A nonlinear transformation based on the frameworks of McClamroch and Wang (1998) and Carignan and Akin (1989) is applied to reduce the dynamic model into three link variables with a kinematic constraint equation. Several different objective functions are applied to find suitable tension solutions. The most relevant objective function for the large cable array robot is to maximize tensions on the two longest cables to keep them sufficiently taut to insure greatest protection from becoming slack. One suitable solution set is obtained for a specific task with realizing one more constraints in the optimization model, based on the fact that in the absence of disturbance forces, the longest cable will provide the least tension when supporting the container.

Cables 20 were initially assumed to have no stretching either transversely or axially and were considered to be rigid bodies, while compression loadings were considered invalid. In that case, the length of each cable 20 is changed by rotating the winches at each mast assembly 18 to reel cables 20 in or out. Container 14 is then initially assumed to be a point mass for the sake of simplicity such that forward kinematics can be obtained in closed form equations. From the forward kinematic equations, the dynamic model of the cable array robot can be written in cable-link space. Cable tensions are considered as generalized forces in the model. This cable-link space approach solves the dynamic problem in terms of cable link lengths, linear link velocities and linear link accelerations. Such data is reliably acquired from ordinary sensors (DGPS, RF beacons, stereo pan tilt cameras, laser, etc.) that are part of the present system.

The dynamic equations of the four-cable mechanism with four generalized coordinates need to handle the fact that, while the geometric configuration is specified for a certain task, there can be redundant cable tensions to achieve the same positions, velocities, and accelerations. The force distribution method is proposed to systematically solve this problem. The concept of constrained motion or force/position control of a robot is first applied to reduce the variables of the dynamic equations to three variables. Next, the cable tensions for certain configurations that are subject to a specific objective function are solved.

The concept of applying constrained motion for the four-cable array robot was described above.

Once a nonlinear transformation is applied to reduce the dynamic model into three link variables with a kinematic constraint equation, the generalized coordinates are divided into two groups, one group with three coordinates for position constraints and the other group with one coordinate for constraint force. In the four-cable mechanism, there are four different combinations to divide these four link variables into two groups; therefore, there are four different sets of transformed dynamic equations that are generated from four different combinations of link variables. While the mathematical treatment of the constrained motion problem is complex, it is also a straightforward application of existing mathematical analyses as set forth in the incorporated references and lends itself well to computer controller-governed operations.

The present system can be operated by a small crew, and little, if any, special equipment. Operation, reliability, maintenance and logistics improvements over existing fixed or mobile crane systems will be significant on a parts count basis alone, notwithstanding a side-by-side comparison of component complexity and costs for conventional mobility systems. The system could generally eliminate the need for many cranes, forklifts and miscellaneous material handling equipment as well as the requirement for highly trained operating, maintenance and logistics personnel. The advantage of this large array "overhead gantry" style of robot compared to complex terrain crawling mobile robots, in hazardous waste material handling for example, is apparent in terms of speed, trajectory planning ability, capacity and reliability.

Until the last few years, portable computing power and graphics interface software, necessary for a reliable material handling system not based on large, expensive-to-operate and complicated bridge/crane systems did not exist. Further, most cranes require extensive operator training and licensing as well as constant logistics supply and maintenance. A robotic system has the advantage of repeatability. Once kinematics are calculated, trajectories are repeatable between any two points every time.

The elaborate logistics involved in moving and erecting cranes, especially at remote sites, are often a time-consuming and an expensive undertaking. Most cranes have a limited radius of operation. Loads cannot be moved horizontally beyond a fixed boom angle without stopping, stowing the boom and outriggers, moving, deploying the boom and outriggers again and resuming operation. Bridge cranes are limited by virtue of their fixed installations. Large rail-bridge crane systems for off loading container ships are limited by their installation while costing well over several million dollars each. All these limitations are mitigated for the array robot alternative described herein.

In addition to the applications described herein, others are equally important, for example, accident or counter-terrorism site investigations, where it is desirable not to disturb the ground around the field of interest with vehicles or personnel. This is especially true in difficult terrain or submerged environments. Another example is positioning sensor suites for hierarchical data acquisition, data management and data display for three-dimensional facility mapping, contaminant mapping and contamination configuration tracking and record keeping. Still another example is found in aging weapons facilities, along with the reduction in nuclear weapons production, which has resulted in a need to transition, decommission, deactivate, excavate and dispose of numerous facilities contaminated with radionuclides and hazardous materials. It is also possible to use the present invention in a dockside version, particularly for temporary ship loading and off-loading, especially in areas where container ship handling facilities are not available.

For all the applications of the present invention, the graphics and control logic, software and hardware is similar. Position (X, Y and Z coordinates) and attitude determination through differential global positioning systems data and visual data from the pan/tilt stereo camera encoders is used by the system computer to develop the control error signal used to determine required torque for the tension cable winches to reduce error in following a desired trajectory.

Because there are so few line items, in contrast with conventional, large bridge crane structures, it is expected that the present system will place few, if any unusual demands on the logistics stream.

The fixed shipboard installation (and shore based systems for that matter) requires no special skills and it should be practical to accomplish the installation in a couple of weeks.

Integrating the mast assemblies 18 into the ship's structure should not be difficult or extensive, though a good naval architecture analysis will have to have been done for each family of vessel used.

The present system is far less complicated from a total system line item count and complexity than conventional material handling crane systems. Additionally, operator experience and skill level requirements are significantly less because most movements can be robotically executed.

The present winch control algorithms, written within the software application CONTROLSHELL (Constellation), are more than adequate for the applications discussed and the environment provides for software component improvements as controller development and dynamic modeling efforts progress. The system's dynamic equations are quite satisfactory. Loads at cargo transfer cycle speeds of 100 fpm and 240 fpm were modeled and found to be well within the capacities of the winch and mast assemblies for the design case (maximum cable angles of 30 degrees from horizontal). For sea-based operations, present shipboard cranes achieve throughput rates of 10 containers per hour in calm seas, versus 45 per hour for the cable array robot (or 90 per hour for the double array system) with fewer deck personnel involved in handling. Moreover, the precision of the present system, achieved with GPS, laser ranging and other sensors, could permit missile replenishment on station rather than having to return to port for re-arming.

Figure 7:
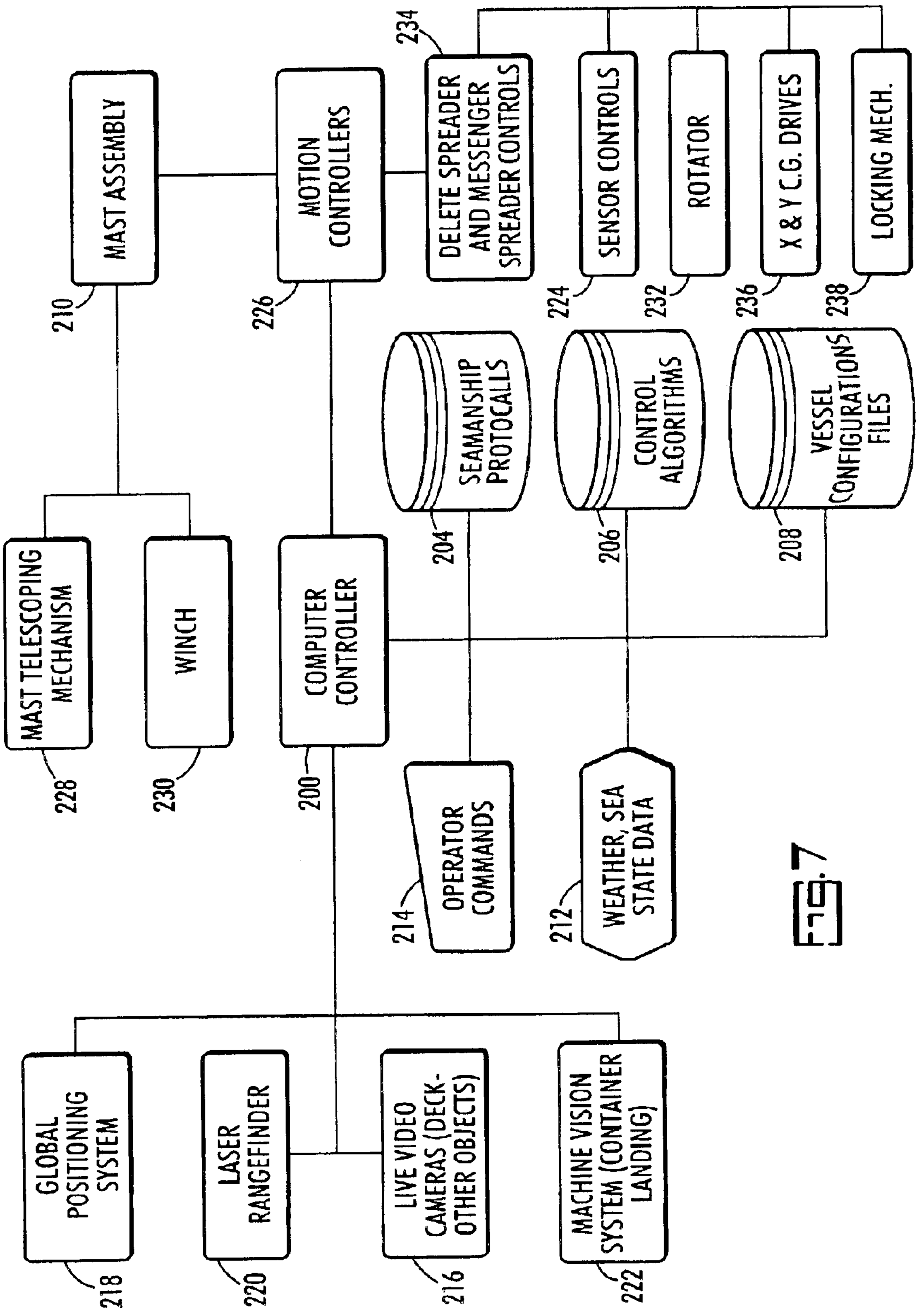
FIG. 7 is a system diagram illustrating the various components of a cargo handling system, according to the present invention.
Figure 8A:
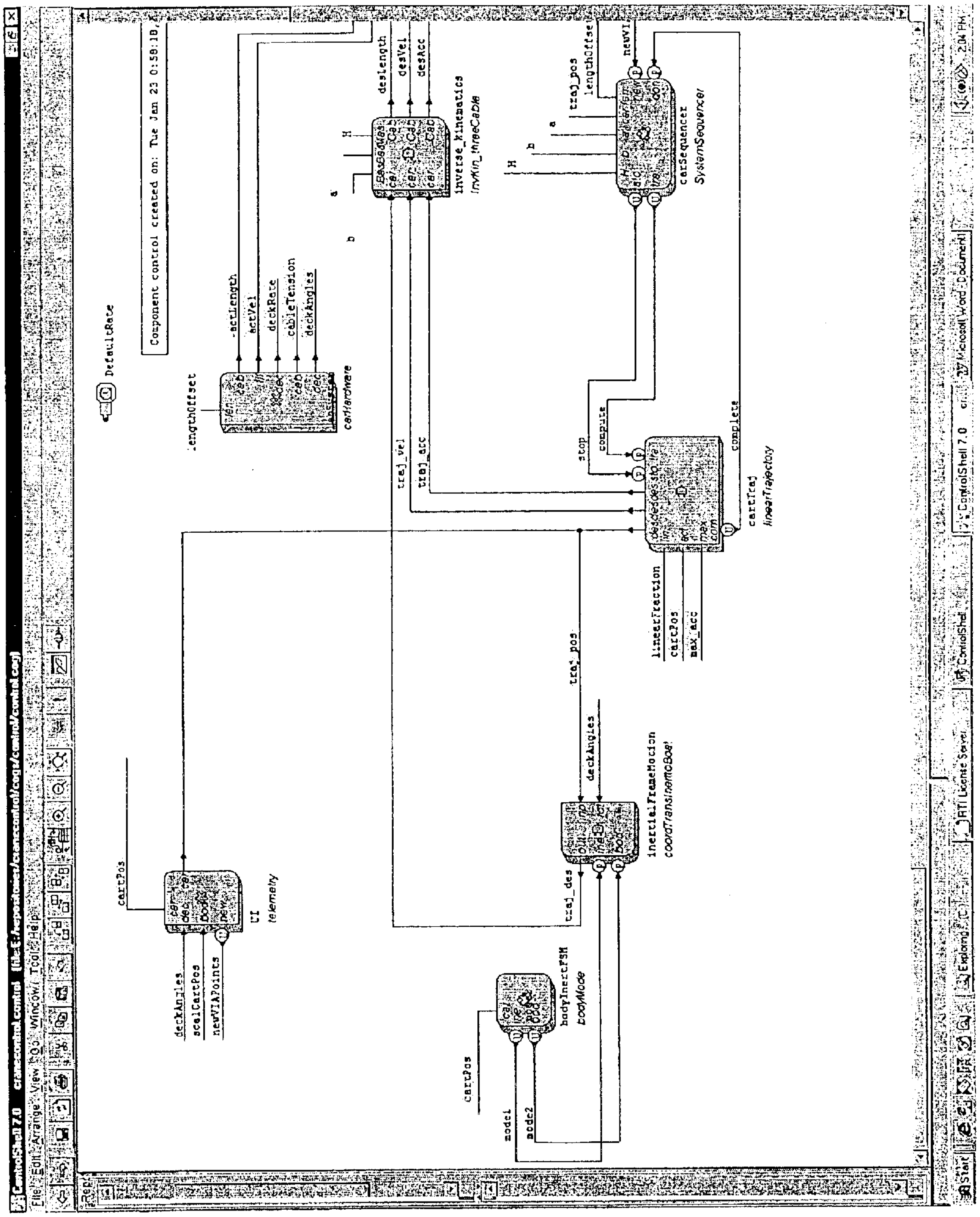
FIGS. 8A–8J is a flow chart software program, shown on several "screen shots", some of which overlap, which was created from a particular control software application, CONTROLSHELL, for controlling the present cargo handling system, according to a preferred embodiment of the present invention.
Figure 8B:
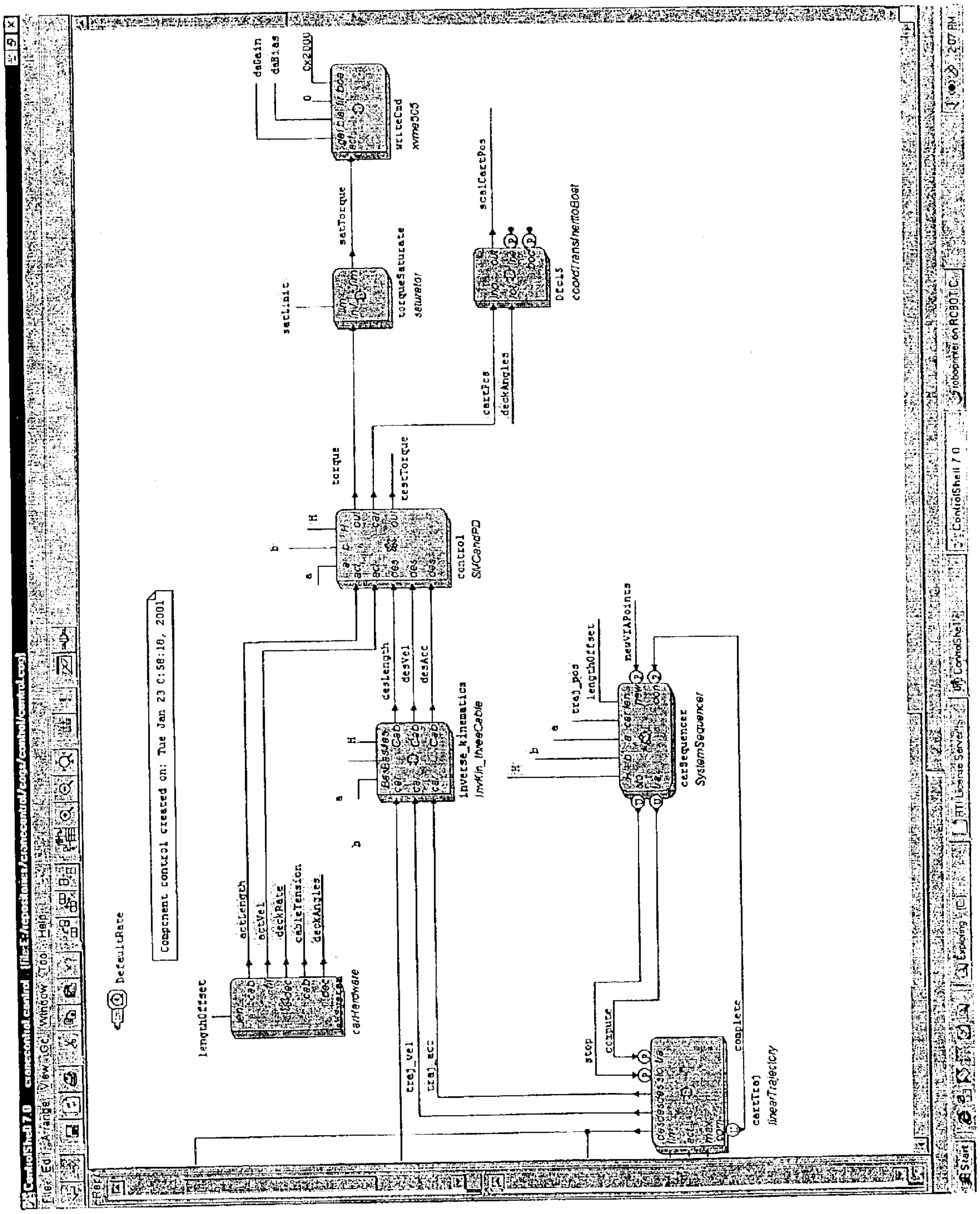
Figure 8C:
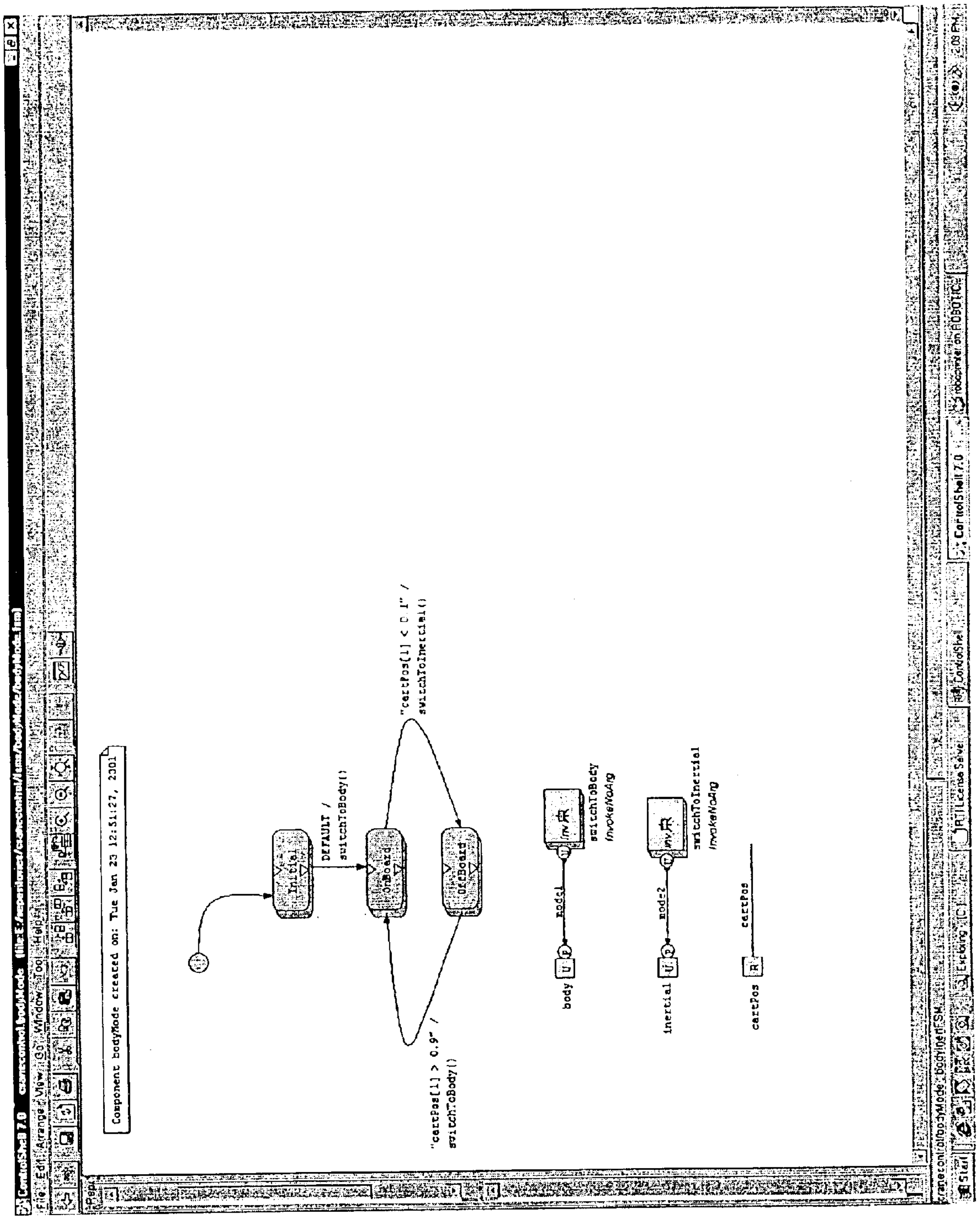
Figure 8D:
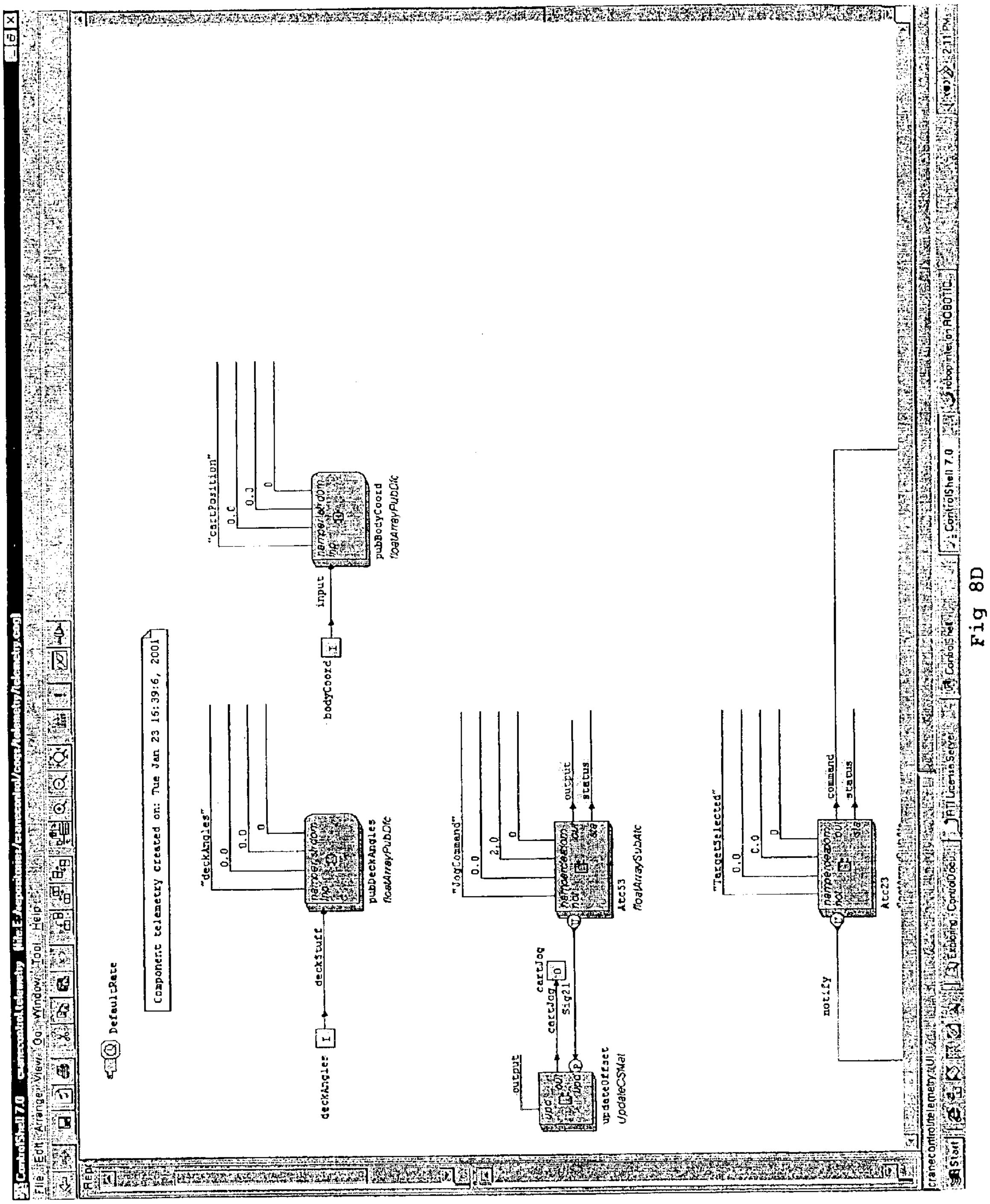
Figure 8E:
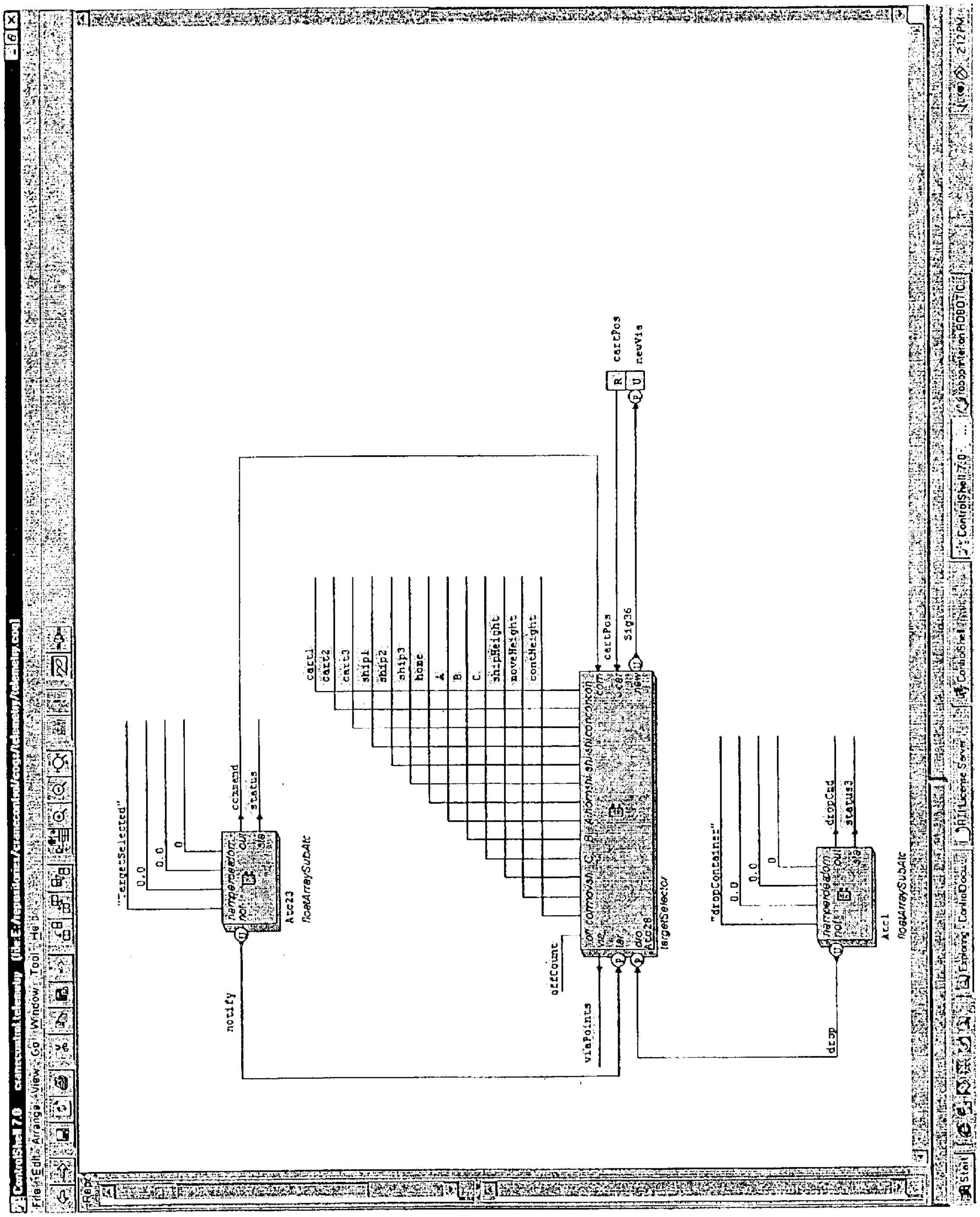
Figure 8F:
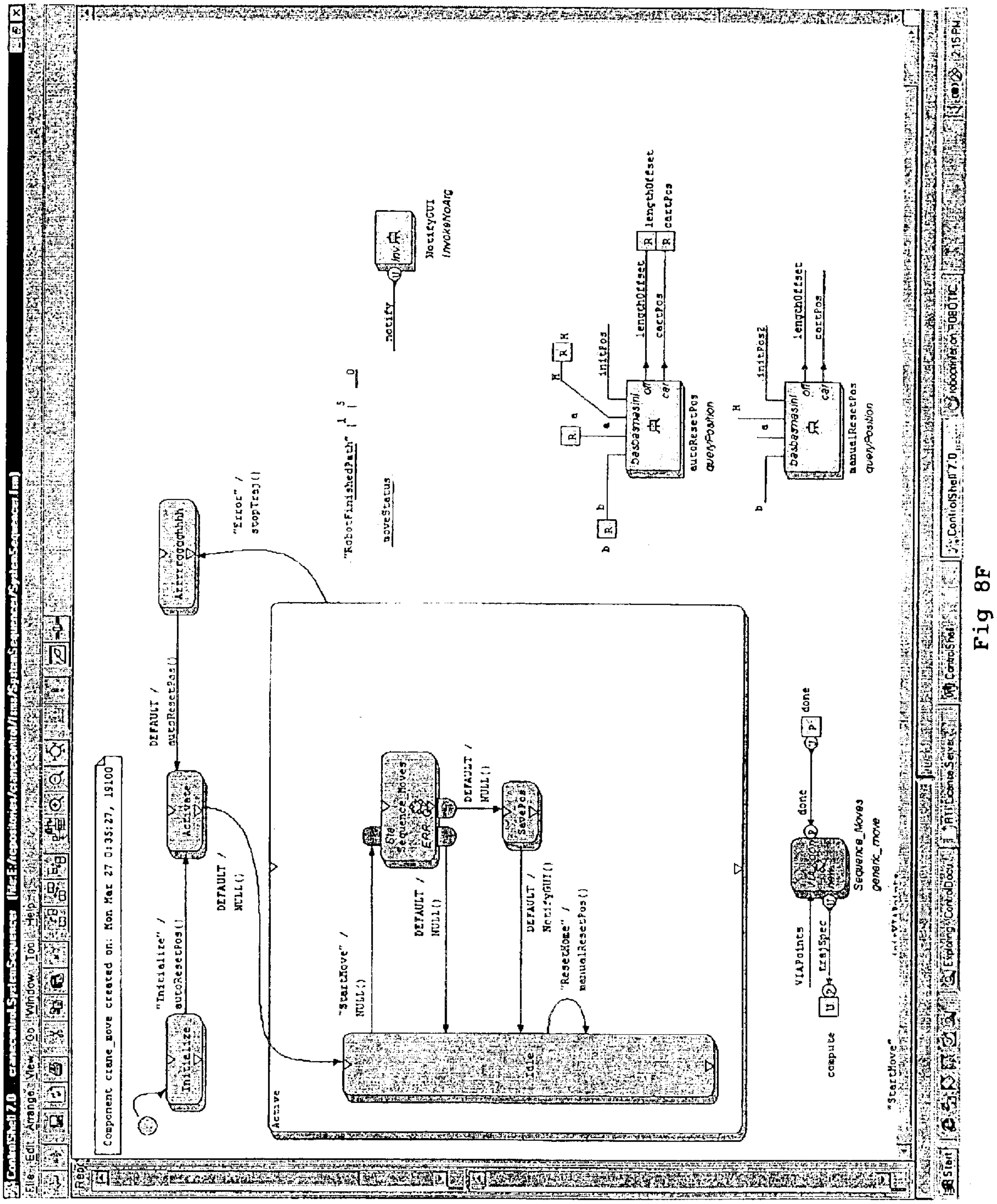
Figure 8G:
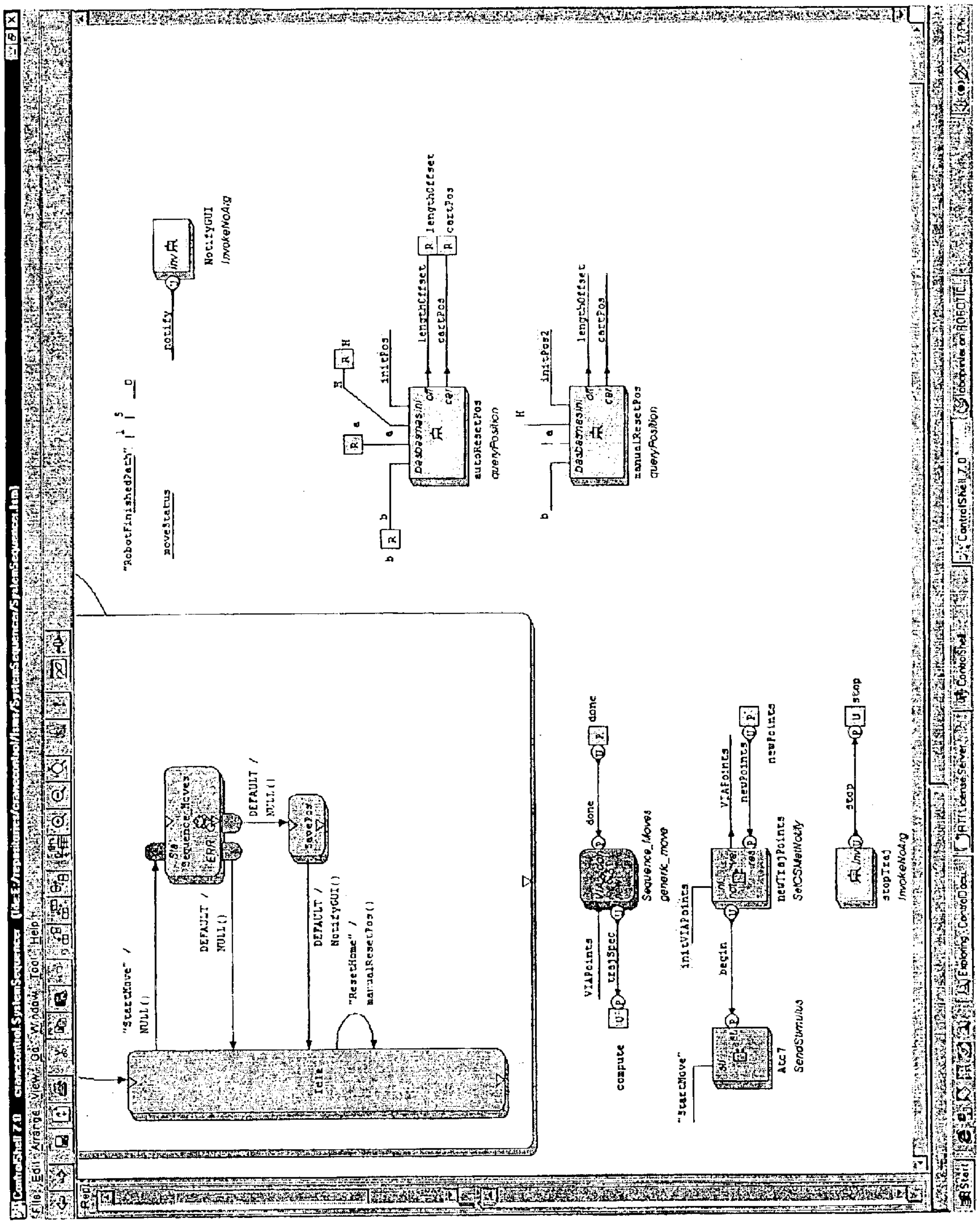
Figure 8H:
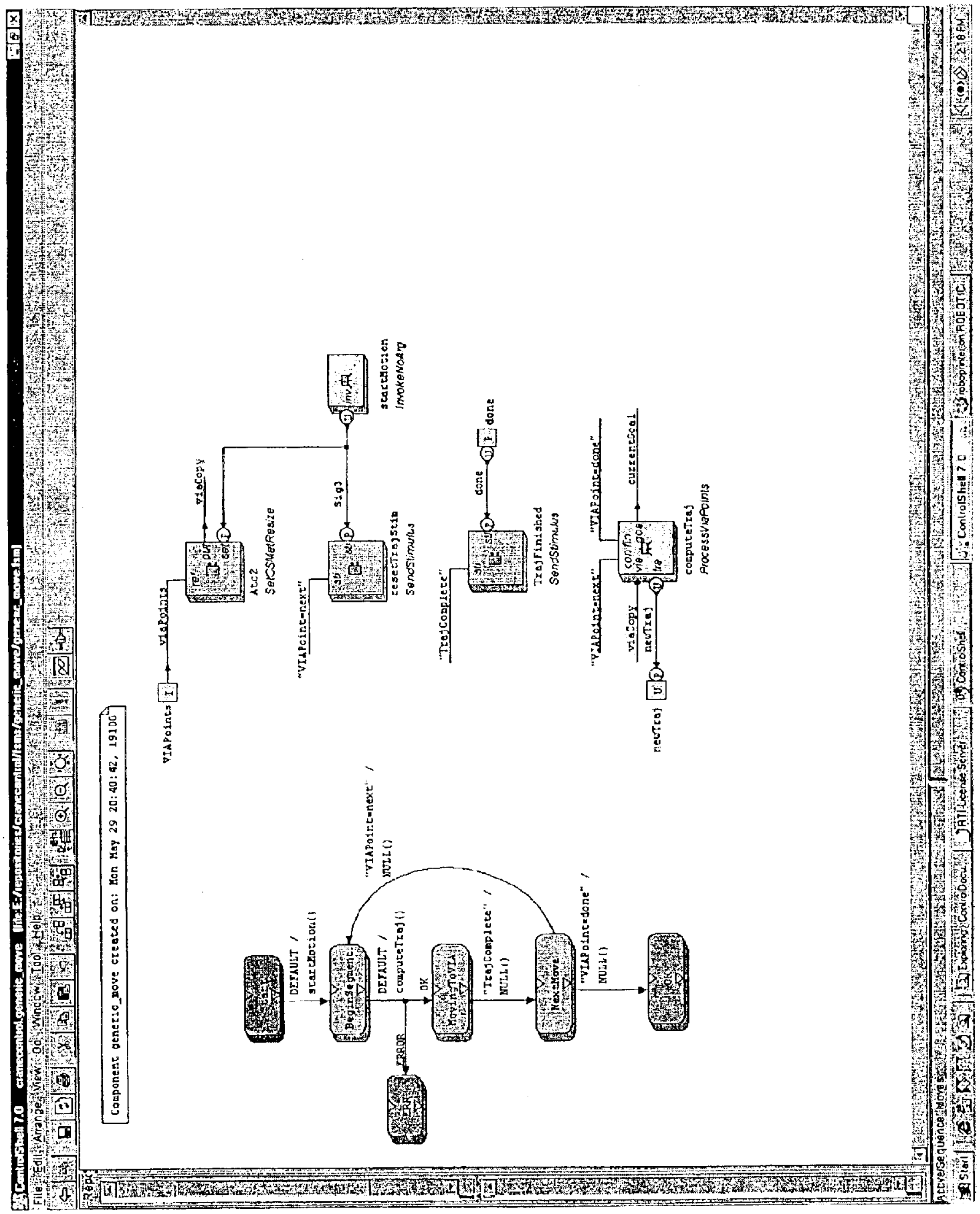
Figure 8I:
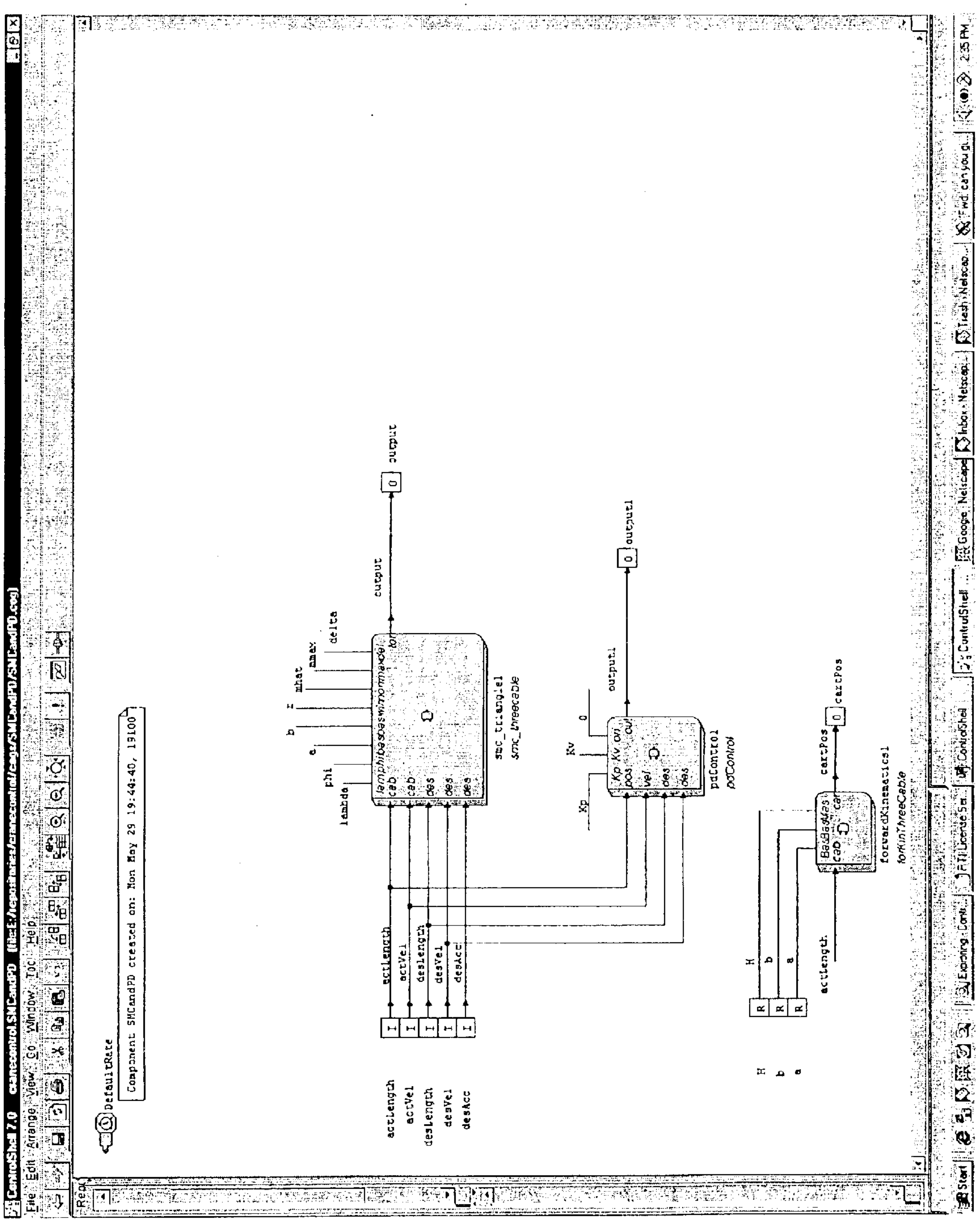
Figure 8J:
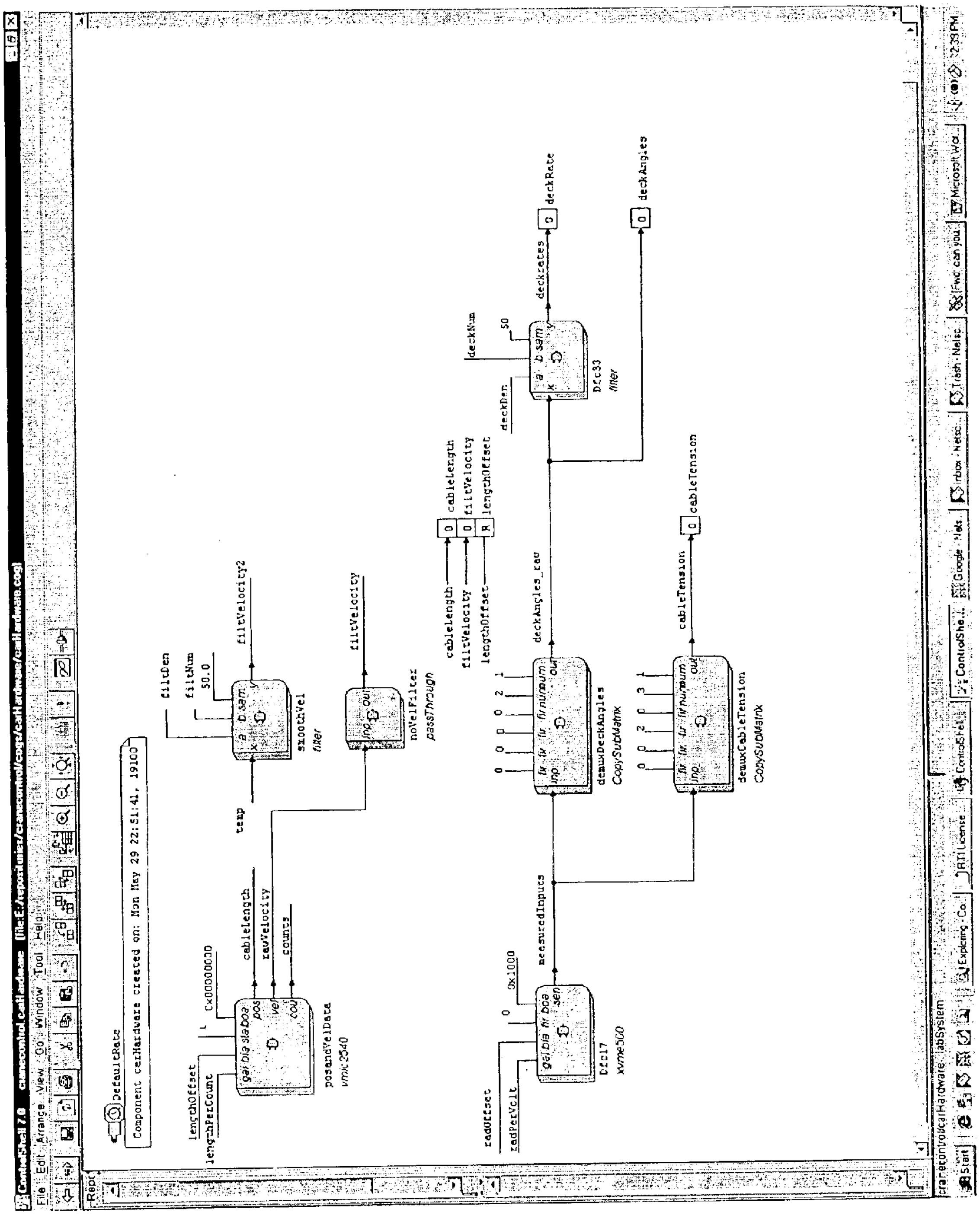

FIG. 7 illustrates a system diagram of the present cargo handling system. At the center of the diagram of FIG. 7 is computer controller 200, which is programmed to respond to direction provided by the user and in turn to effect those directions though the four mast assemblies 18 and end effector 90 using the various sensors.

Computer controller 200 is networked with several databases, namely a protocol database 204 of seamanship protocols that prescribe how loading and unloading is accomplished in various ports and other facilities; a control algorithms database 206 that stores the algorithms that are used to govern and control the movements of end effector 90, mast assemblies 18, and the sensors; and finally a vessel configuration database 208 which stores information about the configuration of ship 10 and the locations of the various containers in its inventory. It will be clear that one database can accommodate storage all three types of information if desired.

Computer controller 200 also has immediate access to current weather and sea data that affect movement of the ship during operations. These data are provided through a data source 212 that may be dedicated to computer controller 200 or shared with other ship functions. Finally, computer controller is programmed to of operator commands 214. These commands constitute in effect a software platform that operates on top of the basic operating system programmed into computer controller 200, which may be, for example a typical windows-type operating system using standard object-based programming.

Computer controller 200 is connected electronically to various sensors, including global positioning system sensors 218 (carried on mast assemblies 18, on bridge 24 and on end effector 90); laser range finders 220 (carried on end effector 90); live video cameras 216 (carried on mast assemblies 18, bridge 24, end effectors 90, and other locations as operations demand); and a machine vision system 222 (carried by end effector 90), which is not a live camera but a vision device that feeds into computer controller 200 for interpretation of the obtained image signals.

These sensors operate in conjunction with each other to provide a field of view for the operator, to inform computer controller 200 of the location of the tips of mast assignment 18 with respect to the end effector 90, to inform computer controller 200 of the distance between end effector 90 and deck 12, and to locate features such as the corners of containers 14.

Computer controller 200 controls mast assembly 210 as well as deck and messenger spreader controls 234 through motion controllers 226. Mast assemblies 18 are deployed by computer controller 200 using a mast telescoping mechanism 228 that operates telescoping arm 40 to deploy mast assembly 18, and its cable is wound and unwound by winch 230 in response to direction from computer controller 200 via motion controllers 226 to move end effector 90.

Sensor controls 224, for controlling the various sensors, are directed by motion controllers 226 so that they are pointing in the desired direction. End effector 90 itself rotates using rotator 232 and adjusts for an off-center center of gravity using X-Y center-of-gravity drives 236. It also has a container locking mechanism 238 that holds container 14 to end effector 90.

Note also that end effector 90 includes both deck spreader 92 and messenger spreader 94 which can move, as described above, with respect to each other when retrieving a container from the ship's hold by use of spreader winches 100. The movement of deck and messenger spreaders 92, 94, together and with respect to each other is controlled by computer controller 200.

FIGS. 8A–8J illustrate a software program generated from CONTROLSHELL, the control software application that can, when programmed, be used to control the present cargo handling system. Those skilled in the use of CONTROLSHELL will readily grasp the interrelationships among the various elements based on the following key:

car means cable array robot;

dfc means data flow component;

fsm means finite state machine;

cog means component "O" ("M", "N", etc.) group pos means position vel means velocity acc means acceleration;

traj mean trajectory;

des means desired;

and therefore terms such as desLength mean desired length, etc.

It will be readily apparent to those skilled in the art of loading and unloading ships and in the art of robotics that many modifications and substitutions may be made to the foregoing preferred embodiments without departing from the spirit and scope of the present invention, which is defined by the appended claims and is applicable to other applications mentioned in paragraph 0012 and elsewhere.

What is claimed is:

1. A system for robotically moving an object, said system comprising:

at least three mast assemblies, each mast assembly having
- a mast,
- a winch, and
- a cable deployed by said winch from said mast, said at least three mast assemblies being spaced apart from each other;

an end-effector, said cable from said each mast assembly being attached to said end effector, said end effector to grip an object in order to move said object; and a real-time automatic feedback computer controller in operational connection with said winches of said at least three mast assemblies, said winches being responsive to said computer controller, said computer controller having control algorithms and a point-and-direct graphical user interface for enabling a user to cause said computer controller to direct movement of said object by said end effector, said point-and-direct graphical interface allowing points to be targeted by an operator, said interface remaining the same regardless of the number of said at least three mast assemblies.

2. The system as recited in claim 1, wherein said system is mounted on a mother platform and is adapted to move said object to a target platform, and wherein said control algorithms solve in real time the closed-chain kinematics and dynamics equations for desired movement of said object, causing said computer controller to adjust said cables to proper length via said winches to move said end-effector and said object when grasped by said end-effector according to said solution.

3. The system as recited in claim 1, further involving plural sensors selected from the group consisting of cameras, lasers, global positioning system sensors, encoders, and tension sensors, said sensors taking measurements that said system uses collectively to monitor and control said cable array robot operations.

4. The system as recited in claim 1, wherein said end-effector further comprises an active spreader having means for rotating said object about a vertical axis; and a messenger spreader carried by said active spreader, said active spreader having winch means for raising and lowering said messenger spreader with respect to said active spreader in looped mode.

5. The system as recited in claim 1, wherein said end-effector includes means for controlling the roll and pitch attitude of said object, when said end-effector grips said object; and means for rotating said container about a vertical axis.

6. The system as recited in claim 1, wherein said user interface to the system interweaves virtual representations of said end-effector with live video of said object in such a way that said end-effector appears to be solid in front of actual objects and outlined in wire frame behind said object.

7. The system as recited in claim 1, wherein said computer controller is adapted to generate a test run of the movement of said object prior to actual movement of said object.

8. The system as recited in claim 1, wherein said object has associated parameters, and wherein said software algorithms include plural closed-loop nonlinear and adaptive software algorithms that are robust to variations in said parameters associated with said object.

9. The system as recited in claim 1, wherein said at least three mast assemblies is at least four mast assemblies, and wherein each cable of said at least four mast assemblies beyond three cables is prevented by said computer controller from ever going slack, said each cable of said at least four mast assemblies beyond three cables carrying a portion of said load while said three cables control said object.

10. The system as recited in claim 1, wherein said each mast of said at least three mast assemblies telescopes between a stored position and a deployed position and wherein, there being a tip to each mast, said tip of said each mast may be farther from each other tip when said each mast is in the deployed position than in the stored position.

11. The system as recited in claim 1, wherein said each mast of said at least three mast assemblies may be on separate, independently moving platform.

12. The system as recited in claim 1, wherein said each mast has a tip and said tip carries a global satellite positioning sensor to determine where said tip is located, and wherein said tip position is input into said software algorithm to produce a cable lengths for said each cable.

13. The system as recited in claim 1, wherein said at least three mast assemblies are installed on the deck of a ship, said system further comprising an offload fairlead, said offload fairlead comprising a set of pulleys oriented so that cables from one or more masts of said mast assemblies can be captured by said set of pulleys when moving said object overboard while cables stay safely above said deck.

14. The system as recited in claim 1, further comprising plural cameras, each camera of said plural cameras having a direction, said plural cameras being independently controlled by said computer controller so that each camera of said plural cameras may be pointed at said object to determine the location of said object by triangulation.

15. A system for moving cargo containers, said system comprising:

three mast assemblies, each mast assembly of said three mast assemblies having a mast, a winch, and a cable deployed by said winch from said mast, said three mast assemblies being spaced apart from each other;

an end effector, said cable from said each mast assembly being attached to said end effector, said end effector to grip a cargo container in order to move said container; and a computer controller in operational connection with said winch of said each mast assembly, said winch being responsive to said computer controller, said computer controller having a user interface for enabling a user to cause said computer controller to direct movement of said cargo container by said end effector.

16. The system as recited in claim 15, further comprising plural cameras, each camera of said plural cameras having a direction, said plural cameras being independently controlled by said computer controller so that each camera of said plural cameras may be pointed in a direction and at least one of said cameras may be pointed at a cargo container, when said cargo container is gripped by said end effector, so that the location of said cargo container can be determined by triangulation.

17. The system as recited in claim 15, further comprising range-finding means carried by said end effector, said range-finding means for determining distance from said end effector to a surface.

18. The system as recited in claim 15, wherein said end effector carries means for rotation about a vertical axis.

19. The system as recited in claim 15, wherein said end effector further comprises a active spreader and a messenger spreader carried by said active spreader, said active spreader having winch means for raising and lowering said messenger spreader with respect to said active spreader.

20. The system as recited in claim 15, wherein said end effector carries means for leveling said container, when said end effector is gripping said cargo container and the center of gravity of said cargo container is not centered in said container.

21. The system as recited in claim 15, wherein said user interface includes a test run capability.

22. The system as recited in claim 15, wherein said end effector has a ground satellite position transmitter for use by the computer controller in determining the position of said end effector.

23. The system as recited in claim 22, wherein said computer controller determines the position of said end effector at least every tenth of a second.

24. The system as recited in claim 15, wherein said each mast of said three mast assemblies telescopes between a stored position and a deployed position.

25. The system as recited in claim 15, wherein said each mast of said three mast assemblies folds between a stored position and a deployed position.

26. The system as recited in claim 15, wherein said each mast of said three mast assemblies has a deployed position and a stored position, and wherein said each mast of said three mast assemblies has a top, and wherein said top of said each mast is farther from each other top when said each mast is in the deployed position.

27. The system as recited in claim 15, wherein said masts are installed on the deck of a ship, said system further comprising a fairlead, said fairlead comprising a pair of pulleys oriented so that cables from two masts of said three mast assemblies can be captured by said pair of pulleys when moving a cargo container off said deck.

28. A system for moving cargo containers, said system comprising:

three mast assemblies, each mast assembly of said three mast assemblies having a mast having a stored and a deployed position, a winch, and a cable deployed by said winch from said mast, said three mast assemblies being spaced apart from each other;

an end effector, said cable from said each mast assembly being attached to said end effector, said end effector to grip a cargo container in order to move said container;

means for determining the position of said end effector; and a computer controller in operational connection with said winch of said each mast assembly and said determining means, said winch of said each mast assembly being responsive to said computer controller, said computer controller having a user interface for enabling a user to cause said computer controller to direct movement of said cargo container from said position by said end effector, said computer controller to move said cargo container from said position determined by said determining means.

29. The system as recited in claim 28, wherein said determining means further comprises plural cameras positioned to observe said end effector, each camera of said plural cameras having a field of view including cross hairs and an axis aligned with the intersection of said cross hairs, said each camera being movable so that an object in said field of view can be aligned with the intersection of said cross hairs, and wherein axes of two or more cameras of said plural cameras can be aligned with said object to determine its position by triangulation.

30. The system as recited in claim 28, wherein said determining means further comprises a global satellite positioning system.

31. The system as recited in claim 28, wherein said determining means determines the position of said effector at least every 0.1 second.

32. The system as recited in claim 28, wherein said user interface is adapted to allow a user to view a trial run of a movement of said cargo container.

33. The system as recited in claim 28, wherein said mast moves between said stored ion by unfolding and telescoping.

34. The system as recited in claim 28, wherein said end effector further comprises a active spreader and a messenger spreader, said messenger spreader being connected to said active spreader using winches and cables.

* * * * *